US012579953B2

(12) United States Patent
Zhao et al.

(10) Patent No.: US 12,579,953 B2
(45) Date of Patent: Mar. 17, 2026

(54) DISPLAY APPARATUS, CONTROL MODULE THEREOF AND DRIVE METHOD THEREFOR

(71) Applicants: BEIJING BOE DISPLAY TECHNOLOGY CO., LTD., Beijing (CN); BOE TECHNOLOGY GROUP CO., LTD., Beijing (CN)

(72) Inventors: Yucheng Zhao, Beijing (CN); Junning Su, Beijing (CN); Zhiming Meng, Beijing (CN); Shou Li, Beijing (CN); Jianzi He, Beijing (CN); Minghan Li, Beijing (CN); Jialing Lv, Beijing (CN); He Chao, Beijing (CN); Hanzhang Niu, Beijing (CN); Jianyang Liu, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 18/995,585

(22) PCT Filed: Dec. 14, 2022

(86) PCT No.: PCT/CN2022/139011
§ 371 (c)(1),
(2) Date: Jan. 16, 2025

(87) PCT Pub. No.: WO2024/124438
PCT Pub. Date: Jun. 20, 2024

(65) Prior Publication Data
US 2026/0018143 A1 Jan. 15, 2026

(51) Int. Cl.
*G09G 3/36* (2006.01)
*G09G 3/34* (2006.01)

(52) U.S. Cl.
CPC ......... *G09G 3/3607* (2013.01); *G09G 3/3406* (2013.01); *G09G 3/3648* (2013.01); *G09G 2300/0452* (2013.01); *G09G 2320/0233* (2013.01); *G09G 2320/029* (2013.01);
(Continued)

(58) Field of Classification Search
None
See application file for complete search history.

(56) References Cited

U.S. PATENT DOCUMENTS

| | | | | |
|---|---|---|---|---|
| 2007/0177787 | A1* | 8/2007 | Maeda | G06T 7/001 382/141 |
| 2010/0125356 | A1* | 5/2010 | Shkolnik | B33Y 30/00 700/118 |

FOREIGN PATENT DOCUMENTS

| | | |
|---|---|---|
| CN | 108417174 A | 8/2018 |
| CN | 108538895 A | 9/2018 |

* cited by examiner

*Primary Examiner* — Parul H Gupta
(74) *Attorney, Agent, or Firm* — Calfee, Halter & Griswold LLP

(57) ABSTRACT

A display apparatus, a control module thereof and a drive method therefor, belonging to the technical field of display. The display apparatus includes a display panel having sub-pixels arranged out of sequence. The display apparatus can display a target picture according to received picture data of an initial picture. The display apparatus is configured to: when the initial picture has at least one feature pattern region, adjust the brightness of at least part of sub-pixels in the feature pattern region, so as to generate a target picture.

20 Claims, 11 Drawing Sheets

(52) U.S. Cl.
CPC ............... *G09G 2320/0646* (2013.01); *G09G 2320/0686* (2013.01)

DISPLAY APPARATUS, CONTROL MODULE THEREOF AND DRIVE METHOD THEREFOR

CROSS REFERENCE

The present application is a U.S. National Stage of International Application No. PCT/CN2022/139011, filed on Dec. 14, 2022, the content of which is incorporated by reference herein in its entirety.

TECHNICAL FIELD

The present disclosure relates to the field of display technologies, and specifically to a display device, and a control component and a driving method thereof.

BACKGROUND

When display devices with sub-pixels arranged in a staggered order display some patterns, such as vertical lines, oblique lines, curves and other line patterns, or display vertical demarcation lines between color block patterns, a clear jagged feeling may be easily generated at edges of these patterns.

It is to be noted that the information disclosed in the above-described background section is intended only to enhance the understanding of the background of the present disclosure, and thus may include information that does not constitute prior art known to those of ordinary skill in the art.

SUMMARY

The present disclosure provides a display device and a control component and a driving method thereof.

According to a first aspect of the present disclosure, there is provided a display device, including a display panel; the display device is capable of displaying a target picture based on picture data of a received initial picture; wherein the display device is configured to: adjust, when the initial picture includes at least one feature pattern area, brightness of at least some sub-pixels of the feature pattern area to generate the target picture;

wherein the feature pattern area includes at least one of a first feature pattern area, a second feature pattern area or a third feature pattern area; the first feature pattern area includes a plurality of first feature pixel groups sequentially arranged along a column direction, and the first feature pixel group includes a first feature pixel, a second feature pixel and a third feature pixel sequentially adjacent in the same row; wherein a brightness difference between the first feature pixel and the second feature pixel is greater than or equal to a brightness threshold; a brightness difference between the third feature pixel and the second feature pixel is greater than or equal to the brightness threshold; individual first feature pixels are arranged in the same column; the second feature pattern area includes a plurality of second feature pixel groups sequentially arranged along the column direction, and the second feature pixel group includes a fourth feature pixel, a fifth feature pixel and a sixth feature pixel sequentially adjacent in the same row; wherein a brightness difference between the fourth feature pixel and the fifth feature pixel is greater than or equal to the brightness threshold; a brightness difference between the sixth feature pixel and the fifth feature pixel is less than the brightness threshold; individual fourth feature pixels are arranged in the same column; the third feature pattern area includes a first sub-pixel group, a second sub-pixel group and a third sub-pixel group sequentially adjacent along a row direction; the second sub-pixel group includes three sub-pixel sequentially adjacent along the row direction; the first sub-pixel group and the third sub-pixel group each include a plurality of sub-pixels sequentially adjacent along the row direction; in the first sub-pixel group, gray scales of individual same-color sub-pixels are the same, and the number of sub-pixels in any the same color is N1; in the third sub-pixel group, gray scales of individual same-color sub-pixels are the same, and the number of sub-pixels in any the same color is N2; both N1 and N2 are positive integers from 1 to 1000; a brightness difference between a pixel in the second sub-pixel group and a pixel in the first sub-pixel group is greater than or equal to the brightness threshold; and a brightness difference between the pixel in the second sub-pixel group and a pixel in the third sub-pixel group is greater than or equal to the brightness threshold;

when the first feature pattern area is adjusted, Gx(SA1) is between G(SA1) and G(SA10), where Gx(SA1) is a gray scale of a first correction sub-pixel in the target picture, G(SA1) is a gray scale of the first correction sub-pixel in the initial picture, and G(SA10) is a gray scale of a reference sub-pixel of the first correction sub-pixel; according to an arrangement mode of sub-pixels on the display panel, the first correction sub-pixel is a sub-pixel of the first feature pixel that is close to the second feature pixel; the reference sub-pixel of the first correction sub-pixel is a sub-pixel located in a second feature pixel adjacent to the first correction sub-pixel and having the same color as the first correction sub-pixel; Gx(SA2) is between G(SA2) and G(SA20), where Gx(SA2) is a gray scale of a second correction sub-pixel in the target picture, G(SA2) is a gray scale of the second correction sub-pixel in the initial picture, and G(SA20) is a gray scale of a reference sub-pixel of the second correction sub-pixel; according to the arrangement mode of the sub-pixels on the display panel, the second correction sub-pixel is a sub-pixel of the third feature pixel that is close to the second feature pixel; and the reference sub-pixel of the second correction sub-pixel is a sub-pixel located in a second feature pixel adjacent to the second correction sub-pixel and having the same color as the second correction sub-pixel;

when the second feature pattern area is adjusted, Gx(SB1) is between G(SB1) and G(SB10), where Gx(SB1) is a gray scale of a third correction sub-pixel in the target picture, G(SB1) is a gray scale of the third correction sub-pixel in the initial picture, and G(SB10) is a gray scale of a reference sub-pixel of the third correction sub-pixel; according to the arrangement mode of the sub-pixels on the display panel, the third correction sub-pixel is a sub-pixel of the fourth feature pixel that is close to the fifth feature pixel; and the reference sub-pixel of the third correction sub-pixel is a sub-pixel located in the fifth feature pixel adjacent to the third correction sub-pixel and having the same color as the third correction sub-pixel; and when the third feature pattern area is adjusted, Gx(SC1) is between G(SC1) and G(SC10), where Gx(SC1) is a gray scale of a fourth correction sub-pixel in the target picture, G(SC1) is a gray scale of the fourth correction sub-pixel in the initial picture, and G(SC10) is a gray scale of a reference sub-pixel of the fourth correction sub-pixel; according to the arrangement mode of the sub-pixels on the display panel, the fourth correction sub-pixel is a sub-pixel in the first feature pixel group that is close to the second feature pixel group; and the reference sub-pixel of the fourth correction sub-pixel is a sub-pixel in the second sub-pixel group that is in the same color as the fourth correction sub-pixel; Gx(SC2) is between G(SC2) and G(SC20), where Gx(SC2) is a gray scale of a fifth correction sub-pixel in the target picture, G(SC2) is a gray scale of the fifth correction sub-pixel in the initial picture, and G(SC20) is a gray scale of a reference sub-pixel of the fifth correction sub-pixel; according to the arrangement mode of the sub-pixels on the display panel, the fifth correction sub-pixel is a sub-pixel in the third sub-pixel group that is close to the second sub-pixel group; and the reference sub-pixel of the fifth correction sub-pixel is a sub-pixel in the second sub-pixel group that is in the same color as the fifth correction sub-pixel.

According to a second aspect of the present disclosure, there is provided a driving method for a display device, wherein a liquid crystal display panel of the display device includes a plurality of pixels distributed in an array, and any one of the pixels includes a plurality of sub-pixels of different colors arranged adjacent along a row direction; individual sub-pixels are arranged in a plurality of sub-pixel columns; and in any one of the sub-pixel columns, two adjacent sub-pixels are different in color;

the driving method for the display device includes:

acquiring picture data;

acquiring a feature pattern area according to the picture data;

using at least some sub-pixels in the feature pattern area as correction sub-pixels, and performing gray scale transition correction on the correction sub-pixels to adjust the feature pattern area; and driving the liquid crystal display panel according to the corrected gray scales of the correction sub-pixels in the feature pattern area;

wherein the feature pattern area includes at least one of a first feature pattern area, a second feature pattern area or a third feature pattern area; the first feature pattern area includes a plurality of first feature pixel groups sequentially arranged along a column direction, and the first feature pixel group includes a first feature pixel, a second feature pixel and a third feature pixel sequentially adjacent in the same row; wherein a brightness difference between the first feature pixel and the second feature pixel is greater than or equal to a brightness threshold; a brightness difference between the third feature pixel and the second feature pixel is greater than or equal to the brightness threshold; individual first feature pixels are arranged in the same column; the second feature pattern area includes a plurality of second feature pixel groups sequentially arranged along the column direction, and the second feature pixel group includes a fourth feature pixel, a fifth feature pixel and a sixth feature pixel sequentially adjacent in the same row; wherein a brightness difference between the fourth feature pixel and the fifth feature pixel is greater than or equal to the brightness threshold; a brightness difference between the sixth feature pixel and the fifth feature pixel is less than the brightness threshold; individual fourth feature pixels are arranged in the same column; the third feature pattern area includes a first sub-pixel group, a second sub-pixel group and a third sub-pixel group sequentially adjacent along a row direction; the second sub-pixel group includes three sub-pixel sequentially adjacent along the row direction; the first sub-pixel group and the third sub-pixel group each include a plurality of sub-pixels sequentially adjacent along the row direction; in the first sub-pixel group, gray scales of individual same-color sub-pixels are the same, and the number of sub-pixels in any the same color is N1; in the third sub-pixel group, gray scales of individual same-color sub-pixels are the same, and the number of sub-pixels in any the same color is N2; both N1 and N2 are positive integers from 1 to 1000; a brightness difference between a pixel in the second sub-pixel group and a pixel in the first sub-pixel group is greater than or equal to the brightness threshold; and a brightness difference between the pixel in the second sub-pixel group and a pixel in the third sub-pixel group is greater than or equal to the brightness threshold;

when the first feature pattern area is adjusted, Gx(SA1) is between G(SA1) and G(SA10), where Gx(SA1) is a gray scale of a first correction sub-pixel in the target picture, G(SA1) is a gray scale of the first correction sub-pixel in the initial picture, and G(SA10) is a gray scale of a reference sub-pixel of the first correction sub-pixel; according to an arrangement mode of sub-pixels on the display panel, the first correction sub-pixel is a sub-pixel of the first feature pixel that is close to the second feature pixel; the reference sub-pixel of the first correction sub-pixel is a sub-pixel located in a second feature pixel adjacent to the first correction sub-pixel and having the same color as the first correction sub-pixel; Gx(SA2) is between G(SA2) and G(SA20), where Gx(SA2) is a gray scale of a second correction sub-pixel in the target picture, G(SA2) is a gray scale of the second correction sub-pixel in the initial picture, and G(SA20) is a gray scale of a reference sub-pixel of the second correction sub-pixel; according to the arrangement mode of the sub-pixels on the display panel, the second correction sub-pixel is a sub-pixel of the third feature pixel that is close to the second feature pixel; and the reference sub-pixel of the second correction sub-pixel is a sub-pixel located in a second feature pixel adjacent to the second correction sub-pixel and having the same color as the second correction sub-pixel;

when the second feature pattern area is adjusted, Gx(SB1) is between G(SB1) and G(SB10), where Gx(SB1) is a gray scale of a third correction sub-pixel in the target picture, G(SB1) is a gray scale of the third correction sub-pixel in the initial picture, and G(SB10) is a gray scale of a reference sub-pixel of the third correction sub-pixel; according to the arrangement mode of the sub-pixels on the display panel, the third correction sub-pixel is a sub-pixel of the fourth feature pixel that is close to the fifth feature pixel; and the reference sub-pixel of the third correction sub-pixel is a sub-pixel located in the fifth feature pixel adjacent to the third correction sub-pixel and having the same color as the third correction sub-pixel; and when the third feature pattern area is adjusted, Gx(SC1) is between G(SC1) and G(SC10), where Gx(SC1) is a gray scale of a fourth correction sub-pixel in the target picture, G(SC1) is a gray scale of the fourth correction sub-pixel in the initial picture, and G(SC10) is a gray scale of a reference sub-pixel of the fourth correction sub-pixel; according to the arrangement mode of the sub-pixels on the display panel, the fourth correction sub-pixel is a sub-pixel in the first feature pixel group that is close to the second feature pixel group; and the reference sub-pixel of the fourth correction sub-pixel is a sub-pixel in the second sub-pixel group that is in the same color as the fourth correction sub-pixel; Gx(SC2) is between G(SC2) and G(SC20), where Gx(SC2) is a gray scale of a fifth correction sub-pixel in the target picture, G(SC2) is a gray scale of the fifth correction sub-pixel in the initial picture, and G(SC20) is a gray scale of a reference sub-pixel of the fifth correction sub-pixel; according to the arrangement mode of the sub-pixels on the display panel, the fifth correction sub-pixel is a sub-pixel in the third sub-pixel group that is close to the second sub-pixel group; and the reference sub-pixel of the fifth correction sub-pixel is a sub-pixel in the second sub-pixel group that is in the same color as the fifth correction sub-pixel.

It should be understood that the above general description and the detailed description that follows are exemplary and explanatory only and do not limit the present disclosure.

BRIEF DESCRIPTION OF THE DRAWINGS

The accompanying drawings herein are incorporated into and form a part of the specification, illustrate embodiments consistent with the present disclosure, and are used in conjunction with the specification to explain principles of the present disclosure. Obviously, the accompanying drawings in the following description are only some of the embodiments of the present disclosure, and for those of ordinary skill in the art, other accompanying drawings may be acquired from these drawings without creative labor.

DETAILED DESCRIPTION

Figure 1:
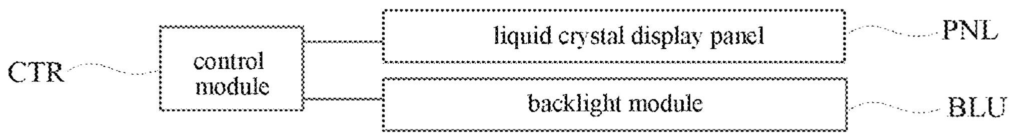
FIG. 1 illustrates a schematic structural diagram of a display device in an embodiment of the present disclosure.

Example embodiments will now be described more fully with reference to the accompanying drawings. However, the example embodiments are capable of being implemented in a variety of forms and should not be construed as being limited to the embodiments set forth herein; rather, the provision of these embodiments allows the present disclosure to be comprehensive and complete and conveys the idea of the example embodiments comprehensively to those skilled in the art. The same reference numbers in the drawings denote the same or similar structures, and thus their detailed descriptions will be omitted. In addition, the accompanying drawings are only schematic illustrations of the present disclosure and are not necessarily drawn to scale.

Although relative terms such as "up" and "down" are used in this specification to describe the relative relationship of one component of an icon to another, these terms are used in this specification only for convenience, such as in accordance with the orientation of the examples described in the accompanying drawings. It will be appreciated that if the device of the icon is flipped so that it is upside down, the component described as being "up" will become the component described as being "down". When a structure is "on" another structure, it may mean that a structure is integrally formed on the other structure, or that a structure is "directly" disposed on the other structure, or that a structure is "indirectly" disposed on the other structure through another structure.

The terms "a", "the", "the" and "at least one" are used to indicate the presence of one or more elements/components/etc.; the terms "including" and "having" are used to indicate open-ended inclusion and mean that there may be additional elements/components/etc. in addition to those listed; the terms "first", "second", and "third" and the like are used only as markers, and are not intended to be quantitative limitations on the objects thereof.

The present disclosure provides a display device that includes a display panel and a control component that drives a display module. FIG. 1 illustrates a schematic structural diagram of a liquid crystal display device in an embodiment of the present disclosure. In an example of FIG. 1, the display panel is a liquid crystal display panel, and the display device also has a backlight module BLU cooperating with the liquid crystal display panel, and the control component CTR drives the liquid crystal display panel and the backlight module BLU at the same time. In other examples of the present disclosure, the display panel may be other types of display panels as well. For example, it may be an OLED (organic electroluminescent diode) display panel, a Micro LED (micro light emitting diode) display panel, a QD-OLED (quantum dot-organic electroluminescent diode) display panel, a QLED (quantum dot light emitting diode) display panel, a PLED (polymer organic electroluminescent diode) display panel, an LED (light emitting diode) display panel or other active light-emitting display panels.

In embodiments of the present disclosure, the structure, function, and driving method for the display device of the present disclosure are for example described by taking a liquid crystal display device as an example of the display device.

From the viewpoint of the layered structure, the liquid crystal display panel may include an array substrate and a color film substrate disposed in sequential layers, and a liquid crystal cell surrounded by a border sealant is disposed between the array substrate and the color film substrate, and liquid crystals are disposed in the liquid crystal cell. The liquid crystal display panel further includes a first polarizer located on a side of the array substrate away from the color film substrate and a second polarizer located on a side of the color film substrate away from the array substrate. The array substrate is provided with a pixel electrode and a pixel driving circuit for loading a data voltage to the pixel electrode. The array substrate or the color film substrate is provided with a common electrode. By controlling the electric field strength between the pixel electrode and the common electrode, a degree of twisting or lodging of the liquid crystal within the corresponding range of the pixel electrode can be adjusted, thereby adjusting the direction of polarization of the polarized light that passes through the liquid crystal, and ultimately adjusting the light exit rate of the liquid crystal display panel within the corresponding range of the pixel electrode.

Figure 2:
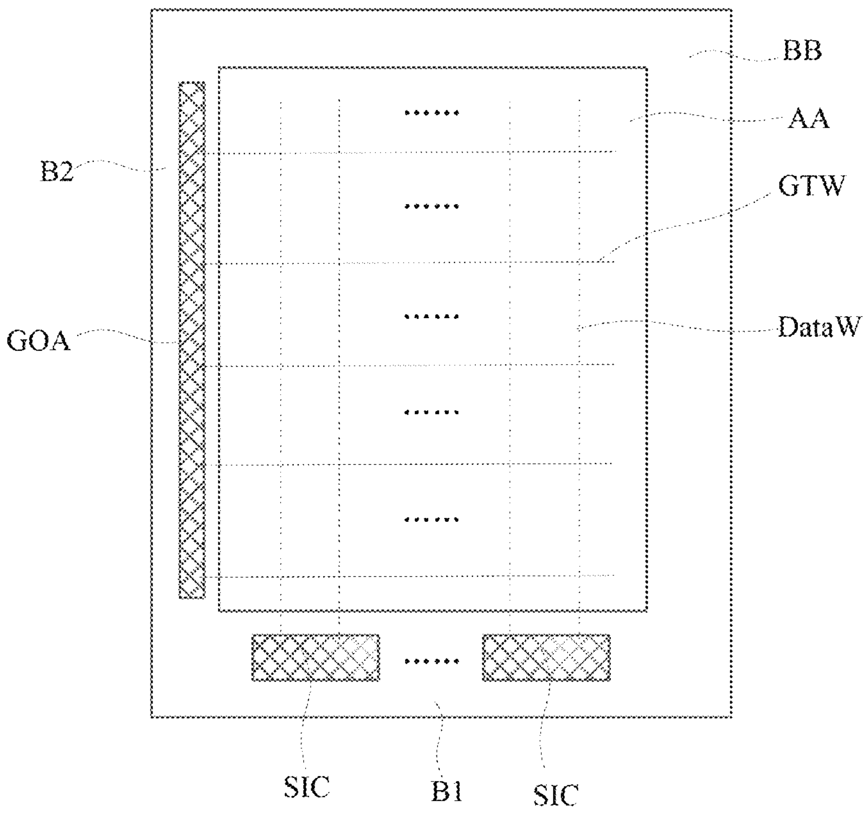
FIG. 2 illustrates a schematic structural diagram of a liquid crystal display panel in an embodiment of the present disclosure.

FIG. 2 illustrates a schematic structural diagram of a liquid crystal display panel PNL in an embodiment of the present disclosure. From a planar perspective, the liquid crystal display panel PNL may include a display area AA and a peripheral area BB surrounding the display area AA. In the display area AA, the array substrate is provided with gate lines GTW extending in the row direction and data lines DataW extending in the column direction, and the gate lines GTW and the data lines DataW define a plurality of pixel areas in which the pixel electrodes and pixel driving circuits may be disposed. In the example, the pixel driving circuit may be a thin-film transistor acting as a switching transistor, one end of the switching transistor is electrically connected to the data line DataW, the other end of the switching transistor is connected to the pixel electrode, and the gate of the switching transistor is connected to the gate line GTW. The peripheral area BB of the array substrate has a first peripheral area B1 bound with the source driving circuit SIC, and a second peripheral area B2 having the gate driving circuit GOA provided. The first peripheral area B1 is disposed at one end of the column direction of the array substrate, and the second peripheral area B2 is disposed at one end of the row direction of the array substrate. The gate driving circuit GOA is electrically connected to respective gate lines GTW for loading the gate lines GTW with a scanning signal for turning the switching transistor on. The source driving circuit SIC is electrically connected to the data line DataW for generating a data voltage based on the screen synchronization data and loading the data voltage to the data line DataW.

Referring to FIG. 2, in this example, the number of source driving circuits SICs of the liquid crystal display panel PNL is multiple, and each of the source driving circuits SICs can drive a plurality of the data lines DataW respectively. Further, the source driving circuit SIC is a chip; the array substrate is provided with an FPC (flexible circuit board) binding area and a source driving circuit binding area in the first peripheral area B1. The source driving circuit SIC can be bound within the source driving circuit binding area, and the source driving circuit binding area can be electrically connected to the data line DataW and FPC binding area respectively through wiring. The FPC binding area can be bound with and connected to the control component CTR through FPC. In this way, signals and voltages of the control component CTR can be transmitted to the source driving circuit SIC via the FPC. Further, the signal between the source driving circuit SIC and the control component CTR can be a LVDS (low voltage differential signal) signal or a mini LVDS signal, in order to reduce signal crosstalk.

Alternatively, in other embodiments of the present disclosure, the liquid crystal display panel PNL may also be presented in other structures. For example, the array substrate can be additionally bound with a gate driving circuit board instead of being provided with a gate driving circuit GOA. For example, the array substrate is provided with a gate driving circuit GOA on both sides in the row direction to reduce the scanning signal voltage drop or to increase the scanning frequency. For example, the array substrate is provided with a source driving circuit SIC on both sides in the column direction to drive the liquid crystal display panel PNL bilaterally, in order to reduce the voltage drop on the data line DataW in the large-sized liquid crystal display panel PNL, especially to reduce the voltage drop on the data line DataW in the spliced screen. For example, a source driving circuit SIC may be provided not on the liquid crystal display panel PNL, but on a Chip on Film (COF). The relative positional relationship and the form of setting between the source driving circuit SIC and the display panel PNL are not limited by the present disclosure to the extent that the source driving circuit SIC is capable of directly driving individual pixels in the display area of the PNL.

It will be appreciated that when the display panel is an active light-emitting display panel such as an OLED display panel, a QLED display panel, a Micro LED display panel, or the like, the display panel may include an array substrate provided with a pixel driving circuit and light-emitting elements as sub-pixels without the need to provide a liquid crystal layer or the like. The structure of the sub-pixels of these display panels, as well as the structure of the pixel driving circuit, and the structure of the wiring may be different from those of the liquid crystal display panel, and the present disclosure does not describe this in detail.

Figure 3:
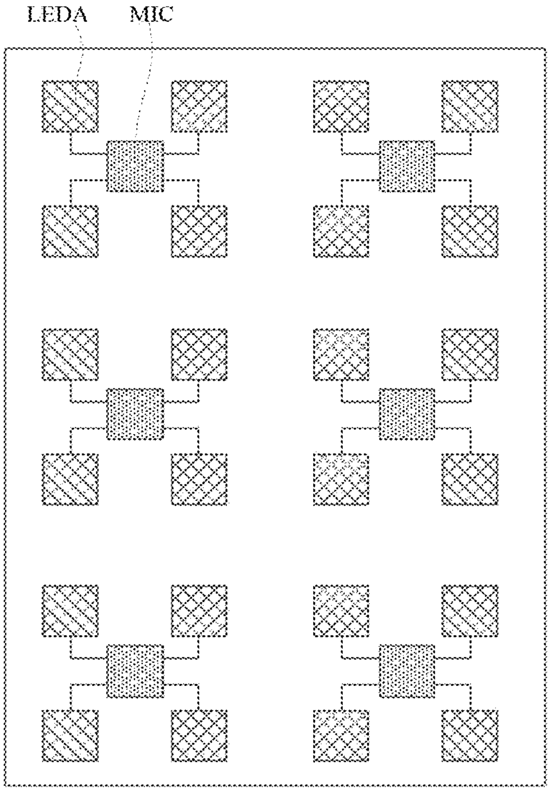
FIG. 3 illustrates a schematic structural diagram of a light board of a backlight module in an embodiment of the present disclosure.

The backlight module exemplified by the embodiments of the present disclosure is a direct type backlight module, which includes a light board. FIG. 3 exemplifies a schematic diagram of a structure of a light board of the backlight module in embodiments of the present disclosure. Referring to FIG. 3, the light board has light areas LEDA distributed in an array, and there are one or more light emitting elements (e.g., LEDs, such as Mini LEDs or Micro LEDs) that are synchronously controlled within each of the light areas LEDAs. Under the control of the control component CTR, the luminous brightness of the light areas LEDAs can be controlled independently of each other to match the picture displayed by the liquid crystal display panel PNL to improve the display effect of the display device. In an example, the control component CTR controls the luminous brightness of the individual light area LEDA by controlling the duty cycles of the individual light-emitting elements when they emit light.

In the example of FIG. 3, the light board may be provided with a microchip MIC, and each microchip MIC may control one or more light areas LEDAs. For example, one microchip MIC controls one light area LEDA or controls four light areas LEDAs. The control component CTR may send the light area data of respective controlled light area to respective microchip MIC. Based on the light area data, the microchip MIC determines the percentage of time (duty cycle) for the electrical conduction and disconnection of respective light area LEDA under its control, thereby controlling the brightness of respective light area LEDA. In other words, the control component CTR can refresh the brightness of respective light area by loading the light area data to respective microchip MIC.

By way of example, in one embodiment, the light board is provided with a control unit, a light area power wiring, a light area ground wiring, a data wiring, etc. Each control unit may include a microchip MIC and light areas LEDA controlled by the microchip MIC. Each light area LEDA includes one light-emitting element or a plurality of light-emitting elements. The plurality of light-emitting elements may be connected in parallel or in series or in a parallel/series mixed connection method. The first power end of the light area LEDA is electrically connected to the light area power wiring, and the second power end of the light area LEDA is electrically connected to the control pin of the microchip MIC. The light area power wiring can be loaded with a more stable driving voltage (ACC), the light area ground wiring can be loaded with ground voltage (GND). When the microchip MIC controls a plurality of light areas LEDA, each light area LEDA is connected to a different control pin. The microchip MIC is connected to the data wiring and the light area ground wiring to receive the light area data from the control component CTR via the data wiring and to control the electrical connection relationship between respective control pin and the light area ground wiring according to the received light area data. Under the control of the microchip MIC, when a control pin is electrically connected to the light area ground wiring, respective light-emitting elements in the light area LEDA connected to the control pin are in a conductive state, and the current on the light area power wiring flows through the light-emitting element to the light area ground wiring, which makes respective light-emitting elements to emit light under a substantially constant current. Under the control of the microchip MIC, when a control pin is electrically disconnected to the light area ground wiring, respective light-emitting elements in the light area LEDA connected to the control pin are in a disconnected state, and the current on the light area power wiring cannot flow through the light-emitting element to the light area ground wiring, which makes respective light-emitting elements do not emit light. In this way, the microchip MIC, under the control of the light area data, can control the duty cycle of respective light-emitting elements in the light area LEDA by controlling the time ratio of the electrical conduction and disconnection of respective control pins, which is reflected in the final effect as the control of the macroscopic brightness of respective light areas LEDA. In this embodiment, the control component CTR is also required to load the microchip MIC with an operating voltage for making the microchip MIC work. The light board may additionally be provided with a chip power line in order to load the operating voltage to the microchip MIC, or the operating voltage may be loaded to the microchip MIC via a data wiring. For example, the data wiring may be multiplexed as a chip power line, which in turn loads both the operating voltage and the light area data to the microchip MIC using power line carrier communication technology.

In an example, the light board may also be provided with a sensor, such as a temperature sensor, a brightness sensor, and the like; sensing signals generated by these sensors may be sent directly to the control component CTR or forwarded to the control component CTR via the microchip MIC, and the control component CTR may adjust the operating state or the operating process of the backlight module BLU directly based on these sensing signals.

In an example, the light board may include a substrate, a driving layer, and an element layer arranged in sequence. The driving layer is provided with at least two wiring metal layers, such as two wiring metal layers containing copper. The wiring metal layers are separated from each other by an insulating layer, and the insulating layer may be an inorganic insulating layer (e.g., silicon nitride or silicon oxide) or an organic insulating layer (e.g., a resin), or may be stacked inorganic insulating layer and organic insulating layer. The wiring metal layers may be connected to each other by a via hole penetrating through the insulating layers. The surface of the wiring metal layer furthest away from the substrate may be formed with a binding pad for binding electronic component, such as binding light emitting element, microchip MIC, and sensor.

In an example, the substrate of the light board may be a glass substrate. Further, the light board may include a plurality of sub-light boards spliced to each other; the sub-light boards are electrically connected to each other, or the individual sub-light boards are independently and directly controlled by the control component CTR.

In an example, the individual light-emitting elements have the same light-emitting color, for example, they are all blue light-emitting elements. A photoluminescent layer, e.g., a quantum dot film, is further provided on the light board to convert the blue light into a more uniform white light.

In some examples, the backlight module BLU may also be provided with one or more of a collimation film, a bandpass filter film, a diffusion sheet, a brightness-enhancing sheet, or other optical film materials, without limitation of the present disclosure.

It is understood that the backlight module BLU of the embodiments of the present disclosure may also adopt other structures, such as adopting a light bar to form a light board, and the present disclosure does not introduce each of these ways.

Figure 4:
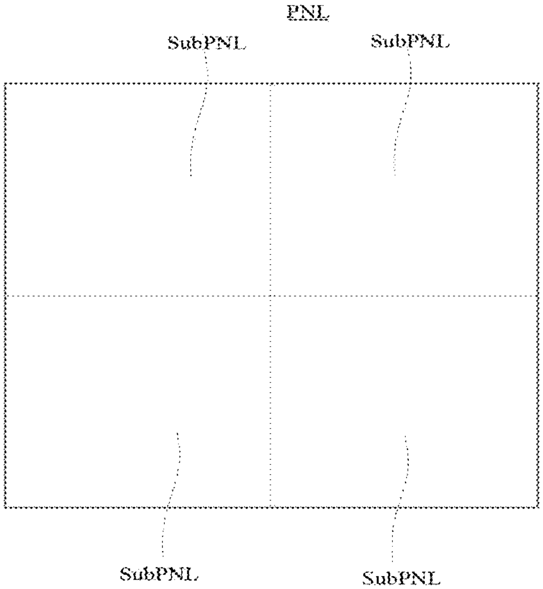
FIG. 4 illustrates a schematic structural diagram of a display panel including a plurality of display sub-panels in an embodiment of the present disclosure.

In some embodiments of the present disclosure, by referring to FIG. 4, a plurality of display panels PNL may be spliced into a larger-sized spliced panel PNLA using the display panels PNL as the spliced unit. In this way, the shape of the spliced panel PNLA may be adjusted or the size of the spliced panel PNLA may be increased. In an example, the display panel PNL may be a large-sized display panel PNL.

For example, it may be a display panel greater than or equal to 45 inches, in particular, a 55-inch display panel. In another embodiment, the display panel PNL may be a special-shaped panel, e.g., may have a plurality of different projections.

Figure 6:
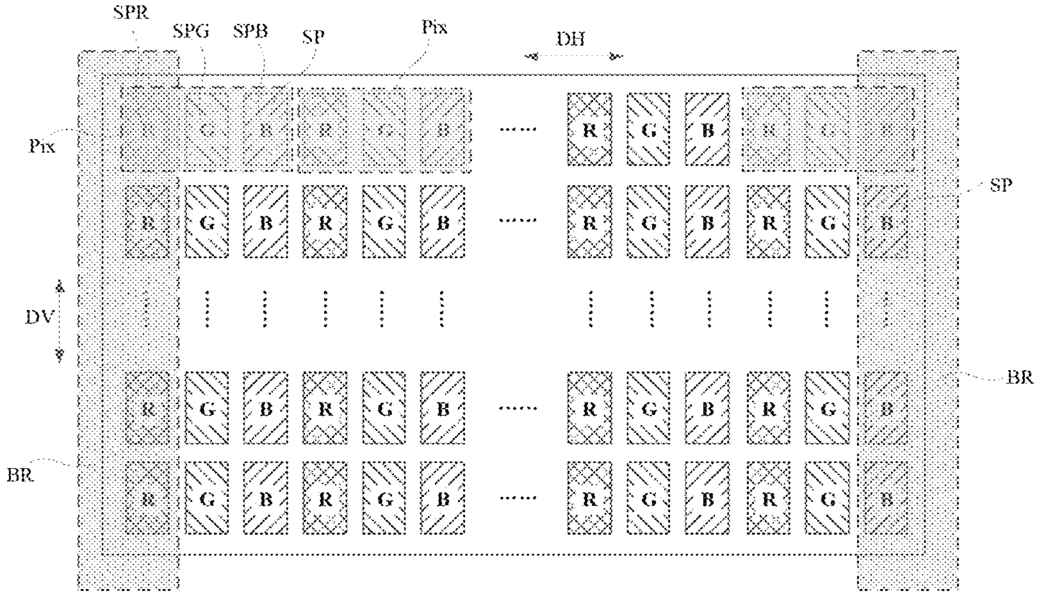
FIG. 6 illustrates a schematic diagram of sub-pixels of a display panel close to a border of a display device being blocked by the border of the display device in the related art.
Figure 7:
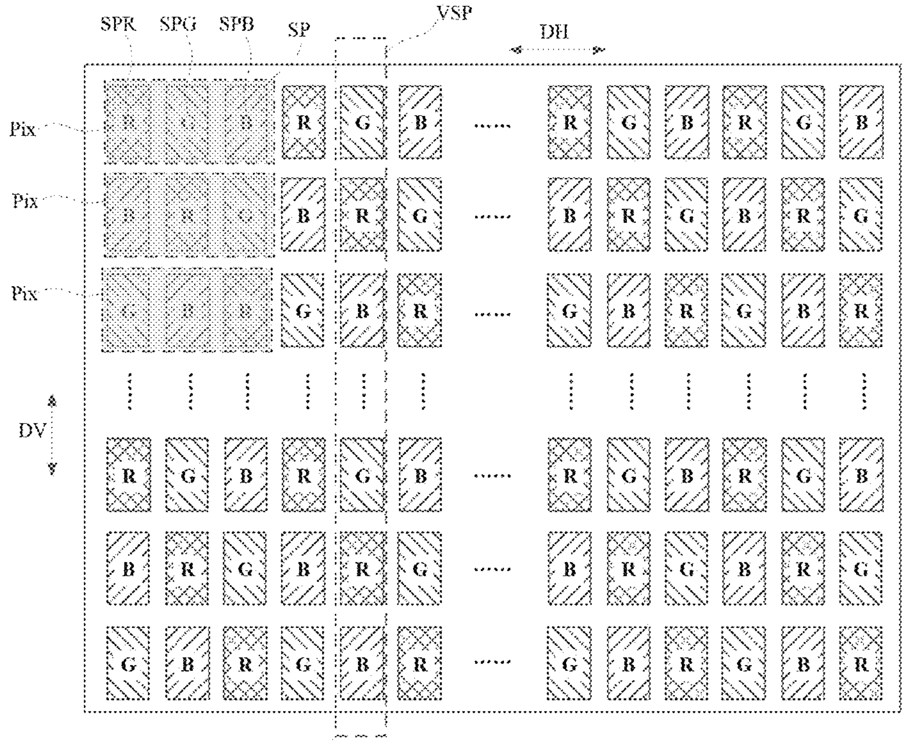
FIG. 7 illustrates a schematic diagram of an arrangement mode of sub-pixels of pixels in a display panel in an embodiment of the present disclosure.

Referring to FIGS. 6 and 7, the display panel PNL in embodiments of the present disclosure includes pixels Pix distributed in an array. Any one of the pixels Pix includes a plurality of sub-pixels SP sequentially adjacent along the row direction DH, and in particular, includes a plurality of sub-pixels SP that are capable of emitting lights of different colors. In the example of FIGS. 6 and 7, the pixel Pix includes three different sub-pixels SP with different light-emitting colors, which are a first sub-pixel SPA, a second sub-pixel SPB, and a third sub-pixel SPC. For example, the first sub-pixel SPA may emit red light as a red sub-pixel R, the second sub-pixel SPB may emit green light as a green sub-pixel G, and the third sub-pixel SPC may emit blue light as a blue sub-pixel B. In other examples of the present disclosure, the Pixel Pix may include sub-pixel SPs of other colors or other numbers of sub-pixel SPs.

Referring to FIGS. 6 and 7, the display panel PNL includes a plurality of pixel columns, and any one of the pixel columns includes a plurality of pixels sequentially arranged along the column direction DV. The pixel column includes a plurality of sub-pixel columns VSP, and each sub-pixel column VSP includes a plurality of sub-pixels SP sequentially arranged along the column direction DV.

In an embodiment of the present disclosure, the display panel PNL of the present disclosure may have a narrow border with a small distance between an edge of the display area AA of the display panel PNL and an edge of the display panel PNL on its corresponding side. For example, on at least one side of the display panel PNL, the distance between the edge of the display area AA of the display panel PNL and the edge of the display panel PNL on this side is less than or equal to 2 millimeters; for example, the distance between a sub-pixel of the edge of the display panel PNL and the edge of the display panel PNL is in the range of 1.4 to 1.5 millimeters. For example, on at least one side of the display panel PNL, the distance between the edge of the display area AA of the display panel PNL and the edge of the display panel PNL on this side is less than or equal to 1 millimeter; for example, the distance between the sub-pixels of the edge of the display panel PNL and the edge of the display panel PNL is between 0.58 mm to 0.68 mm. Specifically, the at least one side of the display panel PNL includes a side where the display panel PNL is spliced with another display panel, so that the width of the area not displayed at the location where the display panel PNL is spliced with another display panel is narrower and the display effect is better.

For example, on each side of the display panel PNL, a distance between an edge of the display area AA of the display panel PNL and an edge of the display panel PNL on this side is less than or equal to 2 mm; for example, a distance between a sub-pixel of an edge of the display panel PNL and an edge of the display panel PNL is 1.7 mm. For example, on each side of the display panel PNL, a distance between an edge of the display area AA of the display panel PNL and an edge of the display panel PNL on this side is no greater than 1 mm; for example, the distance between the sub-pixels of the edge of the display panel PNL and the edge of the display panel PNL is 0.88 mm.

For example, the edge contour of the display panel PNL is rectangular, the edge contour of the display area AA is rectangular, and the overall edge contour of the spliced panel PNLA is rectangular.

When the display panel PNL with a narrow border is applied to a display device, there is a risk that the sub-pixels SP near the edge are obscured by the border BR of the display device due to the height and viewing angle of the border BR of the display device. By way of example, referring to FIG. 8, in an example of the present disclosure, the distance between the sub-pixel columns VSP closest to the edge of the display area AA and the border of the display device is small, and since the border BR has a certain height, the border BR may block the light emitted from the sub-pixel columns VSP when viewed by a user from a large viewing angle, which may result in the sub-pixel columns VSP being visually occluded by the border BR. It will be appreciated that, in practice, the display panel PNL will generally be placed perpendicular to the horizontal plane, and in this case, the borders BR on the left and right sides of the display panel PNL (with reference to the opposite sides along the direction of the rows of pixels Pix in FIG. 8) are prone to obscure the sub-pixel columns VSPs when viewed by the user from a large viewing angle.

Figure 5:
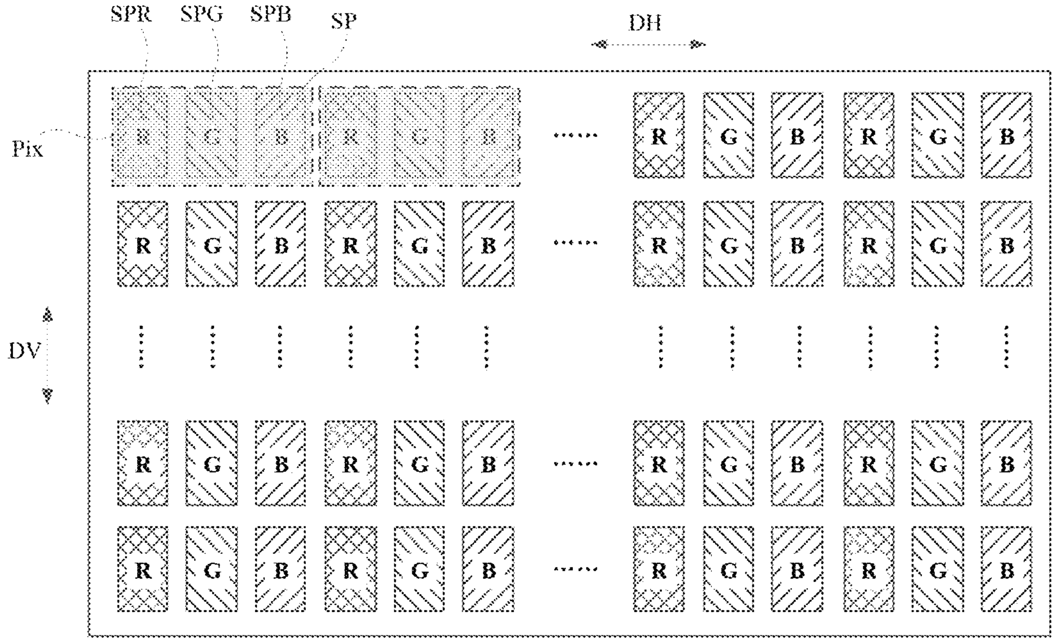
FIG. 5 illustrates a schematic diagram of an arrangement mode of sub-pixels of pixels in a display panel in the related art.

FIGS. 5 and 6 illustrate how sub-pixels SP in pixels Pix are arranged in the related art. Referring to the examples of FIGS. 5 and 6, in the related art, the sub-pixels SP in the individual pixel Pix are arranged in the same manner, which results in the same color of the same column of sub-pixels SP. For example, in the related art, the sub-pixel arrangement of the pixel Pix may be a Real RGB structure. However, when the display panel PNL in the related art is applied to a display device with a narrow border, the sub-pixel columns VSP at the edges of the display panel PNL may be obscured by the border BR of the display device at a large viewing angle. In this case, the displayed picture is prone to color deviation, such as reddish or cyanish, at a position near the edge (edge in the row direction).

Figure 8:
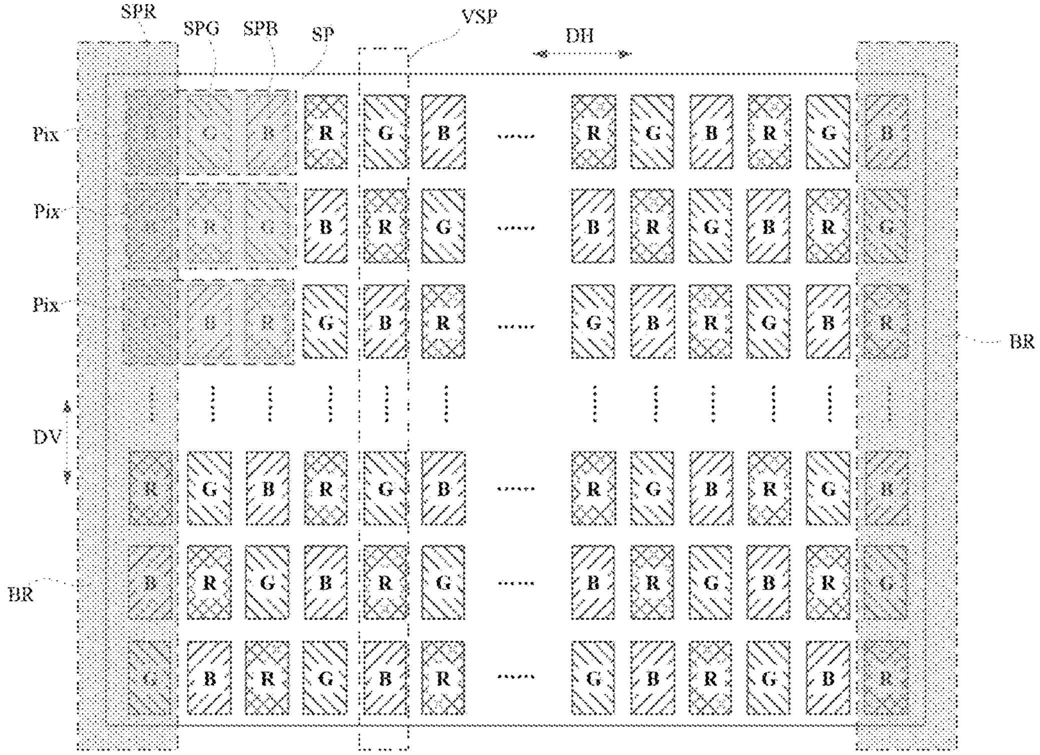
FIG. 8 illustrates a schematic diagram of sub-pixels of a display panel close to a border of a display device being blocked by the border of the display device in an embodiment of the present disclosure.

In order to overcome this defect, and ensure the good display effect for the display device of the present disclosure with a narrow border, referring to FIGS. 7 and 8, in an embodiment of the present disclosure, individual sub-pixels SP may be arranged into a plurality of sub-pixel columns VSPs, and the individual sub-pixel columns VSPs are sequentially arranged along the row direction DH and extend along the column direction DV; each sub-pixel column VSP includes a plurality of sub-pixels SPs provided in the same column. Referring to the examples of FIGS. 7 and 8, two adjacent sub-pixels SP in the same sub-pixel column VSP have different colors. In this way, in embodiments of the present disclosure, the sub-pixels of the display panel PNL are interleaved, i.e., the sub-pixels SP of two adjacent pixels Pix along the column direction DV are arranged in a different way. Referring to FIG. 8, even if the sub-pixel column VSP of the display panel PNL of the present disclosure close to the border BR of the display device is obscured at a large viewing angle, the remaining sub-pixel columns VSP are not single-colored sub-pixel columns VSP, but are sub-pixel columns VSP having a plurality of differently colored sub-pixels. In this way, display anomalies appearing at the edges of the displayed picture can be avoided or effectively reduced.

Further, the pixels Pix arranged in the same row have the same sub-pixel SP arrangement mode.

In an example, referring to FIG. 7, the sub-pixels SP of the pixel Pix are arranged in a periodic manner according to a cycle of every three rows. In each cycle, sub-pixels SPs of a row of pixels Pix are arranged in such a way that a first sub-pixel SPA, a second sub-pixel SPB, and a third sub-pixel SPC are sequentially arranged along the row direction DH;

sub-pixels SPs of a row of pixels Pix are arranged in such a way that a second sub-pixel SPB, a third sub-pixel SPC, and a first sub-pixel SPA are sequentially arranged along the row direction DH; and sub-pixels SPs of a row of pixels Pix are arranged in such a way that a third sub-pixel SPC, a first sub-pixel SPA and a second sub-pixel SPB are sequentially arranged along the row direction DH.

In an example of the embodiments of the present disclosure, the spliced panel PLNA includes a plurality of display panels PNLs spliced with each other, and the individual display panels PNLs may be used as spliced units of the spliced panel. In order to reduce the width of the spliced lines between the display panels PNLs, the size of the borders of the display panels PNLs may be reduced, i.e., display panels PNLs are made to have an extremely narrow border. This allows sub-pixels of the display panel PNL to be close to the edge of the display panel PNL. On the spliced panel PLNA, the sub-pixels of the spliced panel PLNA are also close to the edges of the spliced panel PLNA, making the sub-pixels SP close to the edges of the spliced panel PLNA easily being obscured by the border BR of the display device at a large viewing angle. In the embodiments of the present disclosure, by interleaving the individual sub-pixels, a cyanish edge or a reddish edge caused by the sub-pixel columns VSP being obscured by the border BR can be avoided. Specifically, the sub-pixel column VSP obscured by the border BR includes sub-pixels SP of respective colors, which does not lead to macroscopic color deviation of pixels Pix close to the border BR due to sub-pixels SP of the same color being obscured at a large viewing angle.

Under normal circumstances, since the sub-pixels SP of two adjacent pixels Pix in each pixel column are arranged differently, each pixel column will exhibit a certain jagged effect when displaying some pictures. This jagged effect is basically invisible under the influence of light blending in the surrounding pixels and the like, without affecting the display effect. However, for some line patterns, such as a vertical line (a line along the column direction), a curve or an oblique line (a line at a certain angle with the row direction), if a brightness of the line pattern is significantly different from that of an adjacent pattern, a edge of the line pattern may appear visually jagged. For a vertical demarcation line between two color block patterns, if a brightness difference between the two color block patterns is large, the vertical demarcation line will have a jagged feeling. For example, in FIG. 10, vertical demarcation lines in an area FIGD and an area FIGE will have a certain jagged feeling.

A display device provided by embodiments of the present disclosure can display a target picture according to picture data of a received initial picture. The display device is configured to, when the initial picture includes at least one feature pattern area, adjust the brightness of at least some sub-pixels in the feature pattern area to generate the target picture. In the initial picture, the at least some sub-pixels in the feature pattern area need to be optimized due to a relatively large brightness difference between the at least some sub-pixels. The display device provided by embodiments of the present disclosure can perform gray scale transition correction on gray scales of the at least some sub-pixels in the feature pattern area, so that the target picture actually displayed has a better display effect. Specifically, the jagged feeling generated in the feature pattern area can be alleviated or even eliminated.

In some embodiments of the present disclosure, the display device of the present disclosure can, after acquiring the feature pattern area, determine some sub-pixels in the feature pattern area as correction sub-pixels whose gray scales are to be corrected, and determine reference sub-pixels of the correction sub-pixels. The display device of the present disclosure can determine, according to a gray scale of the correction sub-pixel in the initial picture and a gray scale of the reference sub-pixel in the initial picture, a gray scale of the correction sub-pixel in the target picture, for example, so that the gray scale of the correction sub-pixel in the target picture is between the gray scale of the correction sub-pixel in the initial picture and the gray scale of the reference sub-pixel in the initial picture to realize the gray scale transition correction for the correction sub-pixel, and in turn realize the transition correction for the brightness of the correction sub-pixel, and eliminate or weaken the jagged feeling at the edge of the pattern while ensuring the display effect of the pattern in the feature pattern area.

In embodiments of the present disclosure, the correction sub-pixel, the reference sub-pixel of the correction sub-pixel, etc. may be determined based on an arrangement mode of sub-pixels in the display panel and uncorrected gray scales of these sub-pixels, in order to perform the gray scale transition correction on the gray scale of the correction sub-pixel.

In some examples of the present disclosure, the initial picture data may be subject to sub-pixel ordering first, so that an order of sub-pixels in the picture data is consistent with an order of the sub-pixels of the display panel. Then, the feature pattern area, the correction sub-pixel and the reference sub-pixel are determined based on the ordered picture data.

In some other embodiments of the present disclosure, before the determination of the feature pattern area, the correction sub-pixel and the reference sub-pixel, there may be no need to perform the sub-pixel ordering on the picture data of the initial picture in advance. Even without the sub-pixel ordering, an uncorrected gray scale of each sub-pixel of the display panel may also be determined according to the picture data of the initial picture, and then the feature pattern area, the correction sub-pixel and the reference sub-pixel may be determined based on the uncorrected gray scale of each sub-pixel of the display panel, so as to perform the gray scale transition correction on the sub-pixel to obtain the corrected picture data. According to display requirements of the display panel, the sub-pixel ordering may be performed on the corrected picture data, or the sub-pixel ordering may not be performed.

For example, when the display panel can, by means of hardware settings or algorithm settings, directly drive each sub-pixel in sequence based on the picture data that does not undergo the sub-pixel ordering, the corrected picture data may not undergo the sub-pixel ordering. For example, when a source driving circuit of the display panel is provided with a sub-pixel ordering algorithm or a sub-pixel ordering circuit, the control component CTR may directly send the corrected picture data that does not experience the sub-pixel ordering process to the source driving circuit of the display panel. The source driving circuit may perform the sub-pixel ordering on the corrected picture data and sequentially drive individual sub-pixels of the display panel. For another example, when data lines in the display panel configured to drive the sub-pixels are pre-designed so that when data voltages generated according to the picture data that does not experience the sub-pixel ordering can be sequentially loaded to the proper sub-pixels, the control component CTR can send the corrected picture data without going through the sub-pixel ordering process to the display panel.

Alternatively, if the display panel requires the picture data that undergoes the sub-pixel ordering, the control component CTR may perform the sub-pixel ordering on the corrected picture data so as to obtain the corrected and ordered picture data, and send the corrected and ordered picture data to the display panel.

In other words, when the display panel requires the unordered picture data due to its algorithm, hardware or other settings, the picture data loaded by the control component CTR to the display panel may be the unordered picture data, which may be, for example, picture data which undergoes the gray scale transition correction but does not undergo the sub-pixel ordering. When the display panel requires the ordered picture data due to its algorithm, hardware or other settings, the picture data loaded by the control component CTR to the display panel may be the ordered picture data, which may be, for example, picture data which undergoes the gray scale transition correction and the sub-pixel ordering, and the ordering process of the picture data may be before the gray-scale transition correction or after the gray-scale transition correction.

It can be understood that in embodiments of the present disclosure, the sub-pixel ordering process may be implemented through the sub-pixel ordering circuit, that is, it may be implemented through the hardware in the control component CTR, or may be implemented through the software in the control component CTR, such as through the sub-pixel ordering algorithm in the control component CTR.

In embodiments of the present disclosure, an order of gray scales of at least some sub-pixels in the unordered picture data can be adjusted through the sub-pixel ordering to obtain the ordered picture data. For example, an order of gray scales of some sub-pixels in the picture data of the initial picture may be adjusted. In the pre-ordering picture data (the picture data of the initial picture), the gray scales of the sub-pixels SP of individual pixels are arranged in accordance with the arrangement mode of the sub-pixels SP of the individual pixels. In the ordered (i.e., post-ordering) picture data, the gray scales of the sub-pixels SP of the individual pixels Pix are arranged in accordance with an arrangement mode of the sub-pixels SP of the individual pixels of the display panel (e.g., the liquid crystal display panel) PNL of embodiments of the present disclosure.

For example, in the picture data of the initial picture, data of any pixel includes gray scales of three sub-pixels arranged in sequence, i.e., the gray scale of the red sub-pixel, the gray scale of the green sub-pixel, and the gray scale of the blue sub-pixel, arranged in sequence. In such arrangement mode, the red, green, and blue sub-pixels of each pixel are arranged in the same order by default, i.e., keep the red sub-pixel SPR, the green sub-pixel SPG, blue sub-pixel SPB arranged in sequence. However, in the display panel (e.g., the liquid crystal display panel) PNL of the present disclosure, the arrangement modes of the sub-pixels SP of different pixels Pix may be different, and the pre-ordering picture data is not directly applicable to the driving of the display panel (e.g., the liquid crystal display panel) PNL of the present disclosure. For example, when the individual sub-pixels SP of one pixel Pix of the present disclosure are sequentially arranged in the order of the blue sub-pixel SPB, the red sub-pixel SPR, and the green sub-pixel SPG, it is necessary to adjust the arrangement order of the gray scales of the individual sub-pixels SP according to the actual arrangement of the sub-pixels SP, so that the data of the pixel Pix after the ordering includes the gray scale of the blue sub-pixel, the gray scale of the red sub-pixel and the gray scale of the green sub-pixel in sequence.

In an embodiment of the present disclosure, referring to FIG. 7, each pixel Pix in a display panel (e.g., a liquid crystal display panel) PNL of an embodiment of the present disclosure includes a red sub-pixel SPR, a green sub-pixel SPG, and a blue sub-pixel SPB; and the sub-pixel SPs of the pixel Pix are arranged in a periodic manner according to a cycle of every three rows. In each cycle, the sub-pixels SPs of the first row of pixels Pix are arranged in such a way that the red sub-pixel SPR, the green sub-pixel SPG, and the blue sub-pixel SPB are sequentially arranged along the row direction DH; the sub-pixels SPs of the second row of pixels Pix are arranged in such a way that the green sub-pixel SPG, the blue sub-pixel SPB and the red sub-pixel SPR are sequentially arranged along the row direction DH; and the sub-pixels SPs of the third row of pixels Pix are arranged in such a way that the blue sub-pixel SPB, the red sub-pixel SPR and the green sub-pixel SPG are sequentially arranged along the row direction DH. Each pixel Pix data in the pre-ordering picture data includes a gray scale of the red sub-pixel SPR, a gray scale of the green sub-pixel SPG, and a gray scale of the blue sub-pixel SPB in sequence. The data handling module DHU adjusts the order of the gray scales of the sub-pixels SPs in individual pixel data in the pre-ordering picture data by the sub-pixel ordering algorithm or the sub-pixel ordering sub-unit. Since the interleaving is arranged in a cycle of 3 rows, the arrangement order of the gray scales of the sub-pixels SP in the pixel data of the first row of pixels remains unchanged; the arrangement order of the gray scales of the sub-pixels SP in the pixel data of the second row of pixels is adjusted to the gray scale of the green sub-pixel SPG, the gray scale of the blue sub-pixel SPB, and the gray scale of the red sub-pixel SPR; and the arrangement order of the gray scales of the sub-pixels SP in the pixel data of the third row of pixels is adjusted to the gray scale of the blue sub-pixel SPB, the gray scale of the red sub-pixel SPR and the gray scale of the green sub-pixel SPG. The data of the subsequent rows of pixels are cyclically adjusted in the order of these 3 rows. For example, the sub-pixel ordering process only changes the order of the gray scales of the sub-pixels within the pixel data, and thus is only an order adjustment of the gray scales of the sub-pixels within the pixel data. For example, the sub-pixel ordering algorithm or the sub-pixel ordering sub-unit UA2 only needs to sequentially adjust the order of the gray scales of the sub-pixels within each of the pixel data and set up a cycle of 3 rows.

In embodiments of the present disclosure, the feature pattern area includes at least one of a first feature pattern area, a second feature pattern area, or a third feature pattern area.

The first feature pattern area includes a plurality of first feature pixel groups sequentially arranged along a column direction, and the first feature pixel group includes a first feature pixel, a second feature pixel and a third feature pixel sequentially adjacent in the same row. A brightness difference between the first feature pixel and the second feature pixel is greater than or equal to a brightness threshold, and a brightness difference between the third feature pixel and the second feature pixel is greater than or equal to the brightness threshold. Individual first feature pixels are arranged in the same column.

The second feature pattern area includes a plurality of second feature pixel groups sequentially arranged along the column direction, and the second feature pixel group includes a fourth feature pixel, a fifth feature pixel and a sixth feature pixel sequentially adjacent in the same row. A brightness difference between the fourth feature pixel and the fifth feature pixel is greater than or equal the brightness threshold, and a brightness difference between the sixth feature pixel and the fifth feature pixel is less than the brightness threshold. Individual fourth feature pixels are arranged in the same column.

In an embodiment of the present disclosure, the third feature pattern area includes a first sub-pixel group, a second sub-pixel group and a third sub-pixel group sequentially adjacent along a row direction. The second sub-pixel group includes three sub-pixel sequentially adjacent along the row direction, and the first sub-pixel group and the third sub-pixel group each include a plurality of sub-pixels sequentially adjacent along the row direction. In the first sub-pixel group, gray scales of individual same-color sub-pixels are the same, and the number of sub-pixels in any the same color is N1. In the third sub-pixel group, gray scales of individual same-color sub-pixels are the same, and the number of sub-pixels in any the same color is N2, where both N1 and N2 are positive integers from 1 to 1000. A brightness difference between a pixel in the second sub-pixel group and a pixel in the first sub-pixel group is greater than or equal to the brightness threshold, and a brightness difference between the pixel in the second sub-pixel group and a pixel in the third sub-pixel group is greater than or equal to the brightness threshold.

In another embodiment, in the third feature pattern area, the number of sub-pixels in the second sub-pixel group may not only be 3, but may be in a range of 3 to 5. In other words, the third feature pattern area includes the first sub-pixel group, the second sub-pixel group and the third sub-pixel group sequentially adjacent along the row direction, and the second sub-pixel group includes 3 to 5 sub-pixels sequentially adjacent along the row direction. For example, in this embodiment, gray scales of individual sub-pixels in the second sub-pixel group are the same.

Therefore, the display device may be configured to use one or more of the first feature pattern area, the second feature pattern area, and the third feature pattern area as the feature pattern area for adjustment. It can be understood that when the one or more of the first feature pattern area, the second feature pattern area and the third feature pattern area are not used as the feature pattern area, it may not be adjusted according to the method or an adjustment effect provided by embodiments of the present disclosure. For example, in another embodiment of the present disclosure, the first feature pattern area may exist in the initial picture, and the first feature pattern area may not be used as the feature pattern area for the sub-pixel transition correction (such as the gray scale transition correction) in this embodiment. In yet another embodiment of the present disclosure, the second feature pattern area may exist in the initial picture, and the second feature pattern area may not be used as the feature pattern area for the sub-pixel transition correction in this embodiment. In still another embodiment of the present disclosure, the third feature pattern area may exist in the initial picture, and the third feature pattern area may not be used as the feature pattern area for the sub-pixel transition correction in this embodiment.

In an embodiment of the present disclosure, when the first feature pattern area is used as the feature pattern area for adjustment, Gx(SA1) is between G(SA1) and G(SA10), where Gx(SA1) is a gray scale of a first correction sub-pixel in the target picture, G(SA1) is a gray scale of the first correction sub-pixel in the initial picture, and G(SA10) is a gray scale of a reference sub-pixel of the first correction sub-pixel. According to an arrangement mode of sub-pixels on the display panel, the first correction sub-pixel is a sub-pixel of the first feature pixel that is close to the second feature pixel, and the reference sub-pixel of the first correction sub-pixel is a sub-pixel located in a second feature pixel adjacent to the first correction sub-pixel and having the same color as the first correction sub-pixel. Gx(SA2) is between G(SA2) and G(SA20), where Gx(SA2) is a gray scale of a second correction sub-pixel in the target picture, G(SA2) is a gray scale of the second correction sub-pixel in the initial picture, and G(SA20) is a gray scale of a reference sub-pixel of the second correction sub-pixel. According to the arrangement mode of the sub-pixels on the display panel, the second correction sub-pixel is a sub-pixel of the third feature pixel that is close to the second feature pixel, and the reference sub-pixel of the second correction sub-pixel is a sub-pixel located in a second feature pixel adjacent to the second correction sub-pixel and having the same color as the second correction sub-pixel.

In another embodiment of the present disclosure, gray scales of individual sub-pixels of the first feature pixel are the same, gray scales of individual sub-pixels of the second feature pixel are the same, and gray scales of individual sub-pixels of the third feature pixel are the same. In this case, the reference sub-pixel of the first correction sub-pixel is not necessarily the sub-pixel located in the second feature pixel adjacent to the first correction sub-pixel and having the same color as the first correction sub-pixel. For example, the reference sub-pixel of the first correction sub-pixel may be any one or more sub-pixels in the second feature pixel adjacent to the first correction sub-pixel, or a sub-pixel located in the second feature pixel and adjacent to the first correction sub-pixel. Similarly, the reference sub-pixel of the second correction sub-pixel is not necessarily the sub-pixel located in the second feature pixel adjacent to the second correction sub-pixel and having the same color as the second correction sub-pixel. For example, the reference sub-pixel of the second correction sub-pixel is any one or more sub-pixels located in the second feature pixel adjacent to the second correction sub-pixel, or a sub-pixel located in the second feature pixel and adjacent to the second correction sub-pixel.

It can be understood that any multiple sub-pixels include all sub-pixels, and these sub-pixels have a common gray scale. Therefore, for example, making the reference sub-pixel of the first correction sub-pixel be any multiple sub-pixels located in the second feature pixel adjacent to the first correction sub-pixel includes: making the reference sub-pixel of the first correction sub-pixel be the common gray scale of sub-pixels located in the second feature pixel adjacent to the first correction sub-pixel.

In an embodiment of the present disclosure, when the second feature pattern area is used as the feature pattern area for adjustment, Gx(SB1) is between G(SB1) and G(SB10), where Gx(SB1) is a gray scale of a third correction sub-pixel in the target picture, G(SB1) is a gray scale of the third correction sub-pixel in the initial picture, and G(SB10) is a gray scale of a reference sub-pixel of the third correction sub-pixel. According to the arrangement mode of the sub-pixels on the display panel, the third correction sub-pixel is a sub-pixel of the fourth feature pixel that is close to the fifth feature pixel, and the reference sub-pixel of the third correction sub-pixel is a sub-pixel located in the fifth feature pixel adjacent to the third correction sub-pixel and having the same color as the third correction sub-pixel.

In another embodiment of the present disclosure, gray scales of individual sub-pixels of the fourth feature pixel are the same, gray scales of individual sub-pixels of the fifth feature pixel are the same, and gray scales of individual sub-pixels of the sixth feature pixel are the same. In this case, the reference sub-pixel of the third correction sub-pixel is not necessarily the sub-pixel located in the fifth feature pixel adjacent to the third correction sub-pixel and having the same color as the third correction sub-pixel. For example, the reference sub-pixel of the third correction sub-pixel is any one or more sub-pixels located in the fifth feature pixel adjacent to the third correction sub-pixel, or a sub-pixel located in the fifth feature pixel and adjacent to the third correction sub-pixel.

In an embodiment of the present disclosure, when the third feature pattern area is used as the feature pattern area for adjustment, in a case that the number of sub-pixels in the second sub-pixel group is only 3, Gx(SC1) may be between G(SC1) and G(SC10), where Gx(SC1) is a gray scale of a fourth correction sub-pixel in the target picture, G(SC1) is a gray scale of the fourth correction sub-pixel in the initial picture, and G(SC10) is a gray scale of a reference sub-pixel of the fourth correction sub-pixel. According to the arrangement mode of the sub-pixels on the display panel, the fourth correction sub-pixel is a sub-pixel in the first feature pixel group that is close to the second feature pixel group, and the reference sub-pixel of the fourth correction sub-pixel is a sub-pixel in the second sub-pixel group that is in the same color as the fourth correction sub-pixel. Gx(SC2) is between G(SC2) and G(SC20), where Gx(SC2) is a gray scale of a fifth correction sub-pixel in the target picture, G(SC2) is a gray scale of the fifth correction sub-pixel in the initial picture, and G(SC20) is a gray scale of a reference sub-pixel of the fifth correction sub-pixel. According to the arrangement mode of the sub-pixels on the display panel, the fifth correction sub-pixel is a sub-pixel in the third sub-pixel group that is close to the second sub-pixel group, and the reference sub-pixel of the fifth correction sub-pixel is a sub-pixel in the second sub-pixel group that is in the same color as the fifth correction sub-pixel.

In another embodiment of the present disclosure, if gray scales of individual sub-pixels in the second sub-pixel group are the same, the reference sub-pixel of the fourth correction sub-pixel is not necessarily the sub-pixel in the second sub-pixel group that is in the same color as the fourth correction sub-pixel. For example, the reference sub-pixel of the fourth correction sub-pixel may be any one or more sub-pixels located in the second sub-pixel group, or may be a sub-pixel located in the second sub-pixel group and adjacent to the fourth correction sub-pixel. Similarly, the reference sub-pixel of the fifth correction sub-pixel is not necessarily the sub-pixel in the second sub-pixel group that is in the same color as the fifth correction sub-pixel. For example, the reference sub-pixel of the fifth correction sub-pixel is any one or more sub-pixels located in the second sub-pixel group, or is a sub-pixel located in the second sub-pixel group and adjacent to the fifth correction sub-pixel.

In another embodiment of the present disclosure, if the number of sub-pixels in the second sub-pixel group is not limited to only 3, for example, the number of sub-pixels in the second sub-pixel group may be from 3 to 5, gray scales of individual sub-pixels in the second sub-pixel group may also be defined to be the same. In this case, the reference sub-pixel of the fourth correction sub-pixel may be any one or more sub-pixels located in the second sub-pixel group, or a sub-pixel located in the second sub-pixel group and adjacent to the fourth correction sub-pixel. The reference sub-pixel of the fifth correction sub-pixel may be any one or more sub-pixels located in the second sub-pixel group, or a sub-pixel located in the second sub-pixel group and adjacent to the fifth correction sub-pixel.

In other words, the present disclosure provides a variety of different implementations. In some implementations, the feature pixel is not necessarily limited to a gray pixel (the gray pixel means that gray scales of individual sub-pixels of the pixel are the same, including black, gray and white). In this case, the reference sub-pixel of the correction sub-pixel may be a sub-pixel with the same color as the correction sub-pixel. In some other implementations, if it is defined that only the gray pixel may be used as the feature pixel, the reference sub-pixel of the correction sub-pixel may also be a sub-pixel with another color and may be not necessarily the sub-pixel with the same color.

In some embodiments of the present disclosure, the second sub-pixel group includes only three sub-pixels. Then, when there are a plurality of third feature pattern areas that are adjacent and located in different pixel rows, second sub-pixel groups of these third feature pattern areas may form a line (such as an oblique line or a curve), and a slope of the line (an angle with a pixel row direction) is relatively large. Since a line or a curve with a small slope is on a single pixel row, which is difficult to be displayed though less than three sub-pixels, the curve or the oblique line with the small slope may not be optimized for the display effect based on this embodiment. In some other embodiments of the present disclosure, the number of second sub-pixel groups of the third feature pattern area may not be only 3, which may be, for example, from 3 to 5. In this embodiment of the present disclosure, at least some of lines and curves with small slopes may be optimized for the display effect.

For example, a case where sub-pixels have the same color includes that the sub-pixels are all red, green or blue.

Figure 11:
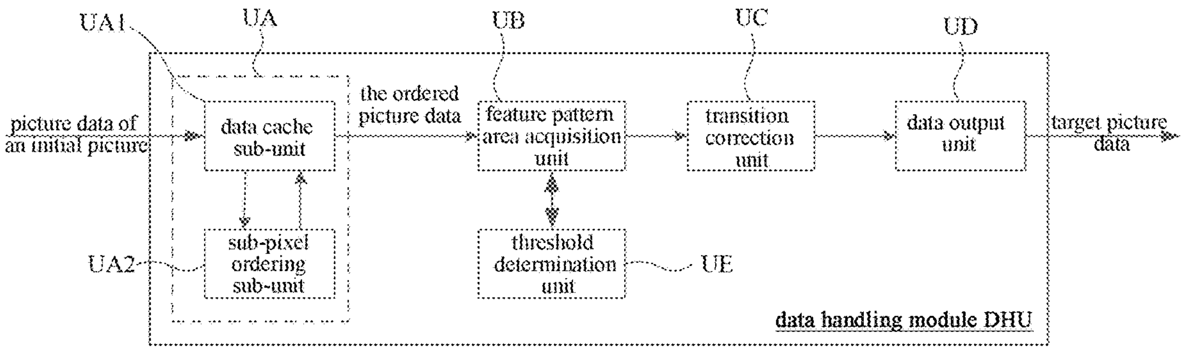
FIG. 11 illustrates a schematic structural diagram of a data handling module in an embodiment of the present disclosure.

The present disclosure further provides a control component for a display device. Referring to FIG. 11, the control component includes a data handling module, which includes a data acquisition unit UA, a feature pattern area acquisition unit UB, a transition correction unit UC, and a data output unit UD.

The data acquisition unit UA is configured to acquire picture data. For example, the picture data includes gray scales of sub-pixels of individual pixels. The picture data may be pre-ordering picture data or post-ordering picture data.

The feature pattern area acquisition unit UB is configured to acquire a feature pattern area according to the picture data. For example, at least one of a first feature pattern area, a second feature pattern area, or a third feature pattern area is acquired to be used as the feature pattern area.

The transition correction unit UC is configured to use at least some sub-pixels in the feature pattern area as correction sub-pixels, and perform gray scale transition correction on the correction sub-pixels to adjust the feature pattern area. The correction sub-pixel and a reference sub-pixel of the correction sub-pixel are determined according to an arrangement mode of sub-pixels on the display panel.

The data output unit UD is configured to drive the liquid crystal display panel according to the corrected gray scales of the correction sub-pixels in the feature pattern area.

Figure 13:
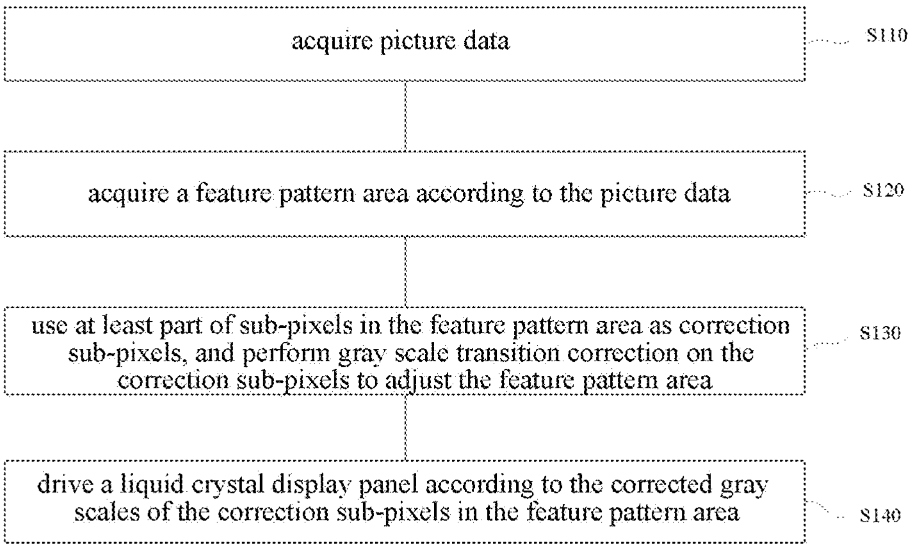
FIG. 13 illustrates a schematic flowchart of a driving method for a display device in an embodiment of the present disclosure.

The present disclosure further provides a driving method for a display device. Referring to FIG. 13, the driving method for the display device may include steps shown in steps S110 to S140.

In the step S110, picture data is acquired.

In the step S120, a feature pattern area is acquired according to the picture data.

In the step S130, at least some sub-pixels in the feature pattern area are used as correction sub-pixels, and gray scale transition correction is performed on the correction sub-pixels to adjust the feature pattern area.

In the step S140, the liquid crystal display panel is driven according to the corrected gray scales of the correction sub-pixels in the feature pattern area.

In the following, the display device, the control component and the driving method provided by embodiments of the present disclosure will be further exemplified with reference to the accompanying drawings.

Figure 12:
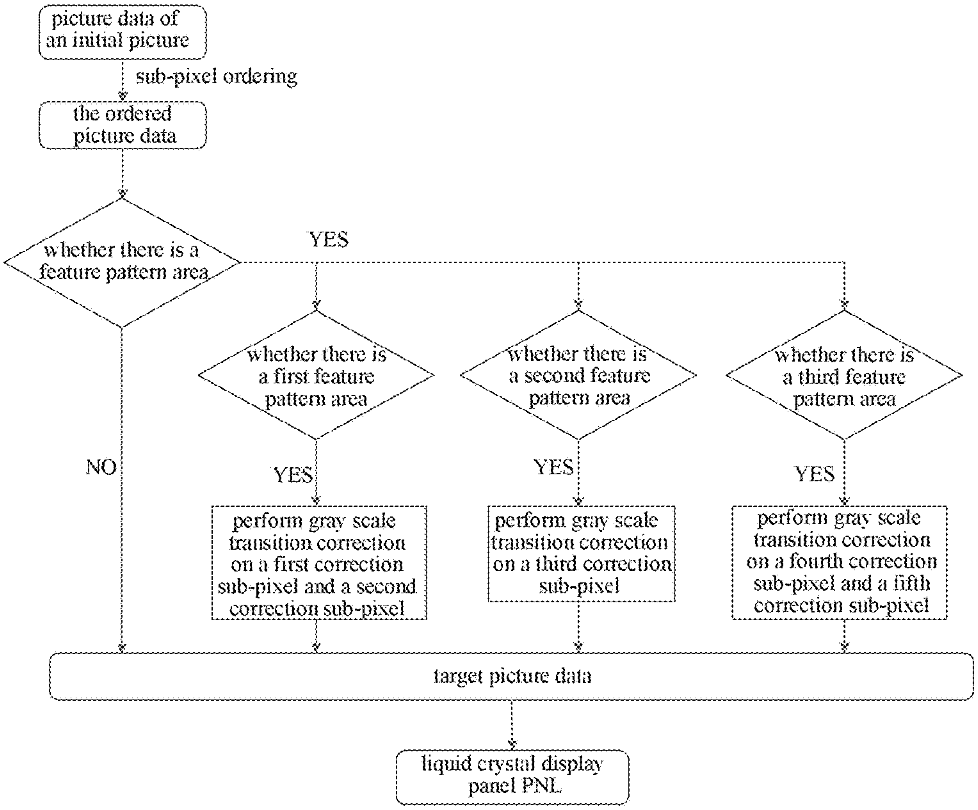
FIG. 12 illustrates a schematic diagram of a principle of a driving method for a display device in an embodiment of the present disclosure.

FIG. 12 illustrates a schematic flowchart of a driving method. In this example, the sub-pixel ordering is performed first, and then the gray scale transition correction is performed. In this example, picture data of an initial picture undergoes the sub-pixel ordering to form the ordered picture data, and the ordered picture data is used to acquire the feature pattern area and perform the gray scale transition correction on the correction sub-pixel. When the feature pattern area may be acquired according to the ordered picture data, the gray scale transition correction is performed on the correction sub-pixel in the feature pattern area to obtain the target picture data. When there is no feature pattern area in the initial picture according to the ordered picture data, the ordered picture data is directly used as the target picture data. It can be understood that in other embodiments of the present disclosure, the sub-pixel ordering may not be performed first, for example, the sub-pixel ordering may be performed after the gray scale transition correction, or the display panel may directly receive and adapt to the picture data that does not undergo the sub-pixel ordering.

In an embodiment of the present disclosure, acquiring the picture data may be acquiring the picture data of the initial picture. The picture data of the initial picture may be directly used to acquire the feature pattern area without going through the sub-pixel ordering process. It can be understood that the correction sub-pixel and the reference sub-pixel need to be determined based on the arrangement mode of the sub-pixels on the display panel, rather than based on an arrangement structure of sub-pixels in the initial picture data. This embodiment is applicable to a case where the control component CTR does not need to perform the sub-pixel ordering or the control component CTR performs the sub-pixel ordering after performing the gray scale transition correction. Alternatively, in some examples, the sub-pixel ordering may also be performed after the determination of the correction sub-pixel and the reference sub-pixel and before the execution of the gray scale transition correction on the correction sub-pixel.

In another embodiment of the present disclosure, acquiring the picture data may be acquiring the ordered (i.e., post-ordering) picture data. In this way, the sub-pixel arrangement structure in the ordered picture data is the same as the sub-pixel arrangement structure on the display panel, and gray scales of the sub-pixels in the ordered picture data may be directly used as gray scales of the sub-pixels at corresponding positions on the display panel.

In an embodiment of the present disclosure, when the picture data is acquired, the picture data of the initial picture may be acquired. Then, gray scale positions of individual sub-pixels SP in the picture data of the initial picture are adjusted, according to an arrangement structure of individual sub-pixels SP in the liquid crystal display panel PNL, to obtain the ordered picture data.

In an embodiment of the present disclosure, the data acquisition unit UA is configured to acquire the picture data of the initial picture, and adjust, according to the arrangement mode of sub-pixels on the display panel, an arrangement order of gray scales of at least some sub-pixels in the picture data of the initial picture to obtain the ordered picture data.

In an example, the data acquisition unit UA includes a data cache sub-unit UA1 and a sub-pixel ordering sub-unit UA2. The data cache sub-unit UA1 is configured to acquire the picture data of the initial picture.

The sub-pixel ordering sub-unit UA2 is configured to adjust, according to the arrangement mode of sub-pixels on the display panel, the arrangement order of the gray scales of the at least some sub-pixels in the picture data of the initial picture, so that the data in the data cache sub-unit UA1 is updated to the ordered picture data.

Referring to FIG. 12, in embodiments of the present disclosure, the feature pattern area includes at least one of a first feature pattern area, a second feature pattern area, or a third feature pattern area. In the example of FIG. 12, the three different pattern areas of the first feature pattern area, the second feature pattern area, and the third feature pattern area being all used as feature pattern areas is taken as an example for illustration. It can be understood that in other embodiments of the present disclosure, the feature pattern area does not include any one or two of the first feature pattern area, the second feature pattern area, and the third feature pattern area. Correspondingly, the correction sub-pixel includes one or more of the first correction sub-pixel, the second correction sub-pixel, the third correction sub-pixel, the fourth correction sub-pixel, the fifth correction sub-pixel, etc. The first correction sub-pixel and the second correction sub-pixel are determined based on the first feature pattern area, the third correction sub-pixel is determined based on the second feature pattern area, and the fourth correction sub-pixel and the fifth correction sub-pixel are determined based on the third feature pattern area. In embodiments of the present disclosure, the first feature pattern area, the second feature pattern area and the third feature pattern area are determined based on the picture data before the gray scale transition correction.

It can be understood that the driving method and the control component of embodiments of the present disclosure may, for each frame of picture data, acquire the feature pattern area and perform the gray scale transition correction. In this way, different feature pattern areas may be acquired for different picture data. Alternatively, it is also possible that part or all of the feature pattern areas remain unchanged.

In some embodiments of the present disclosure, the first feature pattern area as the feature pattern area may be acquired and adjusted. In this case, the first feature pattern area may be acquired according to the picture data.

Figure 14:
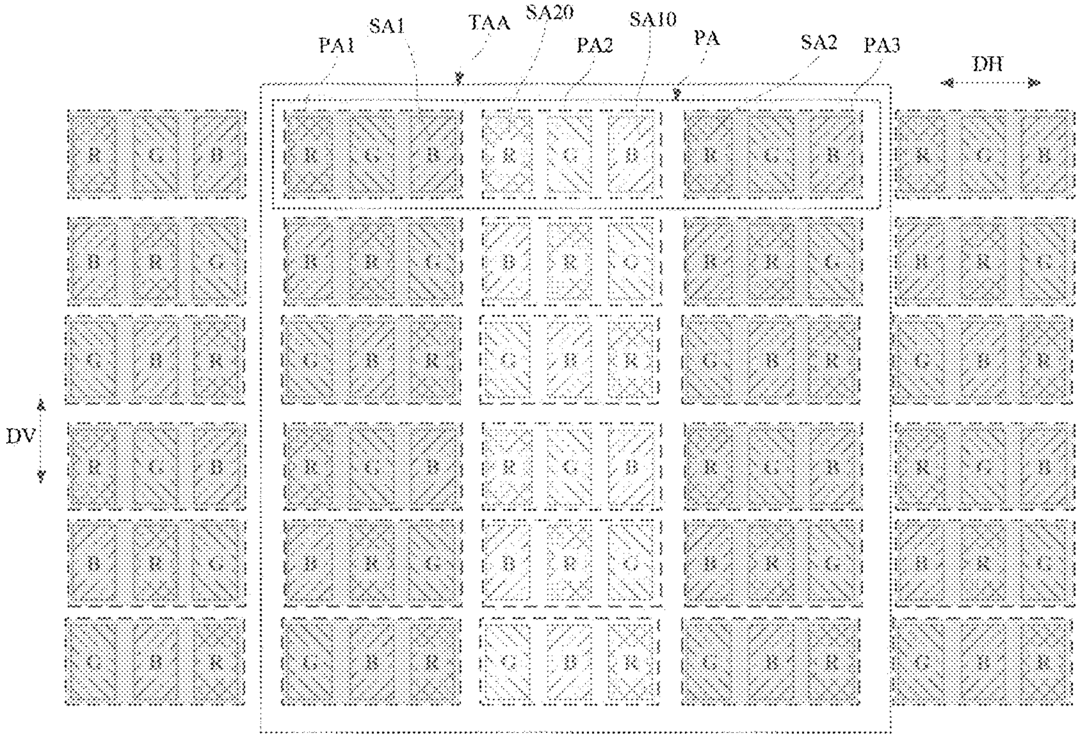
FIG. 14 illustrates a schematic diagram of a first feature pattern area in an embodiment of the present disclosure.
Figure 15:
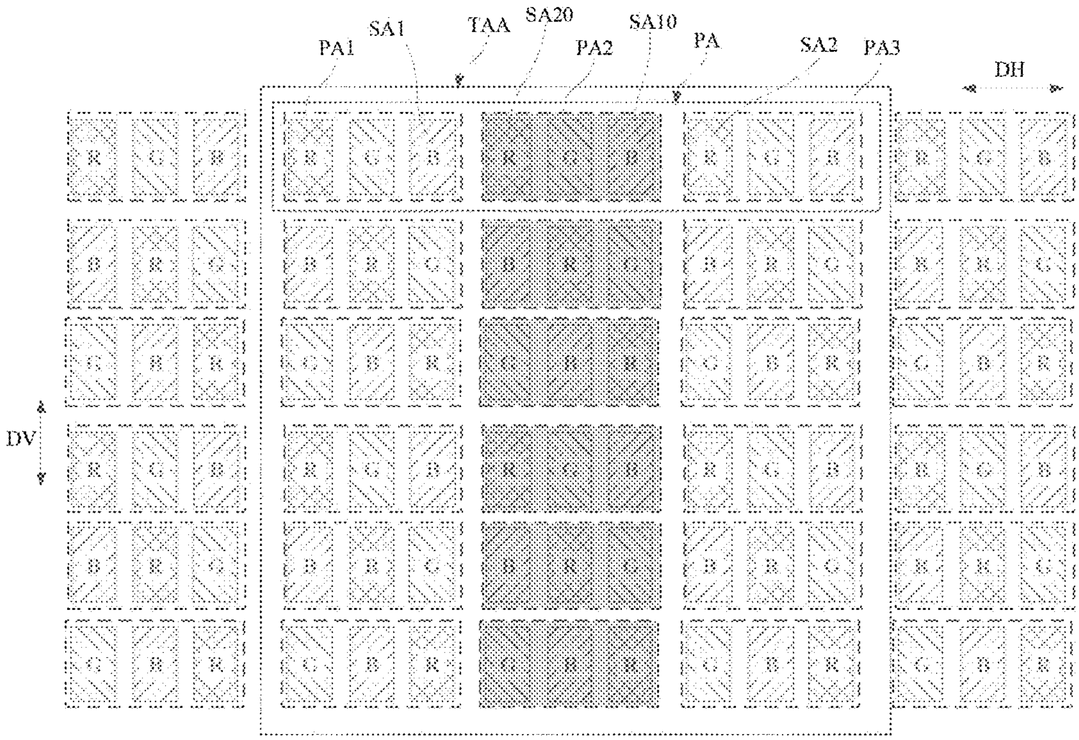
FIG. 15 illustrates a schematic diagram of a first feature pattern area in an embodiment of the present disclosure.
Figure 16:
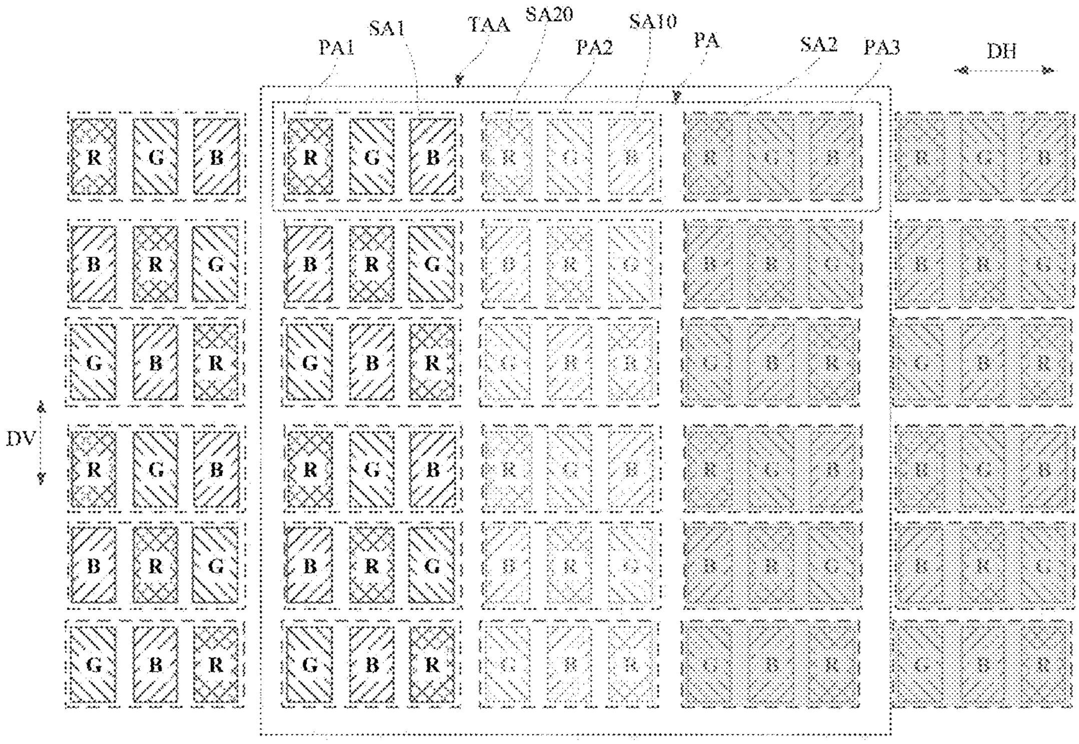
FIG. 16 illustrates a schematic diagram of a first feature pattern area in an embodiment of the present disclosure.

Referring to FIGS. 14 to 16, the first feature pattern area TAA includes a plurality of first feature pixel groups PA sequentially arranged along a column direction DV, and the first feature pixel group PA includes a first feature pixel PA1, a second feature pixel PA2 and a third feature pixel PA3 sequentially adjacent in the same row. A brightness difference between the first feature pixel PA1 and the second feature pixel PA2 is greater than or equal to a brightness threshold Lset, and a brightness difference between the third feature pixel PA3 and the second feature pixel PA2 is greater than or equal to the brightness threshold Lset. Individual first feature pixels PA1 are arranged in the same column.

When the first feature pattern area is adjusted, according to an arrangement structure of sub-pixels on the display panel, a sub-pixel SP of the first feature pixel PA1 close to the second feature pixel PA2 is used as a first correction sub-pixel SA1 for the gray scale transition correction, and a sub-pixel SP of the third feature pixel PA3 close to the second feature pixel PA2 is used as a second correction sub-pixel SA2 for the gray scale transition correction, so that Gx(SA1) is between G(SA1) and G(SA10), and Gx(SA2) is between G(SA2) and G(SA20), where Gx(SA1) is a corrected gray scale of the first correction sub-pixel SA1, G(SA1) is a pre-correction gray scale of the first correction sub-pixel SA1, and G(SA10) is a gray scale of a reference sub-pixel SA10 of the first correction sub-pixel. The reference sub-pixel SA10 of the first correction sub-pixel is a sub-pixel SP located in the second feature pixel PA2 adjacent to the first correction sub-pixel SA1 and having the same color as the first correction sub-pixel SA1. Gx(SA2) is a corrected gray scale of the second correction sub-pixel SA2, G(SA2) is a pre-correction gray scale of the second correction sub-pixel SA2, and G(SA20) is a gray scale of a reference sub-pixel SA20 of the second correction sub-pixel SA2. The reference sub-pixel SA20 of the second correction sub-pixel is a sub-pixel SP located in the second feature pixel PA2 adjacent to the second correction sub-pixel SA2 and having the same color as the second correction sub-pixel SA2.

The liquid crystal display panel PNL is driven according to the corrected gray scales of the first correction sub-pixel SA1 and the second correction sub-pixel SA2.

In this embodiment, when there is the first feature pattern area TAA in the picture data, individual second feature pixels PA2 in the first feature pattern area TAA form a feature vertical line (a single-pixel line along the column direction), and brightness differences between this feature vertical line and patterns on both sides are both relatively large. If gray scales of some sub-pixels in the first feature pattern area TAA are not corrected, both side edges of the feature vertical line will present a relatively obvious jagged feeling. In the step S130 of the present disclosure, the gray scales of the first correction sub-pixel SA1 and the second correction sub-pixel SA2 may be corrected, so that a brightness difference between a sub-pixel SP on the display panel immediately adjacent to the second feature pixel PA2 and the second feature pixel PA2 is reduced, and in this process, each gray scale of the second feature pixel PA2 remains unchanged. In this way, visual serrations that may appear on both sides of the second feature pixel PA2 can be eliminated and the display effect of the feature vertical line can be improved, while ensuring the normal display of the second feature pixel PA2. As a counterexample, if the gray scale of each second feature pixel PA2 is adjusted, for example, a gray scale of a sub-pixel SP of the second feature pixel PA2 that is adjacent to the first feature pixel PA1 and a gray scale of a sub-pixel SP of the second feature pixel PA2 that is adjacent to the third feature pixel PA3 are corrected, which causes that the feature vertical line formed by respective second feature pixels PA2 becomes visually narrower and unclear. For example, when respective second feature pixels PA2 form a white vertical line and respective first feature pixels PA1 and third feature pixels PA3 form black patterns, the reduction of the gray scales of sub-pixels SP of the second feature pixel PA2 adjacent to the first feature pixel PA1 and the third feature pixel PA3 will cause a brightness and a width of the white vertical line to decrease, leading to the degradation of the display effect of the white vertical line. It can be understood that if there is no first feature pattern area TAA in the initial picture, the gray scale transition correction will not be performed on the first correction sub-pixel SA1 and the second correction sub-pixel SA2 accordingly In some embodiments of the present disclosure, the brightness differences between the feature vertical line and patterns on both sides in the first feature pattern area TAA are both relatively large, which may be that the feature vertical line is darker than the patterns on both sides in the row direction (see FIG. 15), or the feature vertical line is brighter than the patterns on both sides in the row direction (see FIG. 14), or the feature vertical line is darker than a pattern on a side and is brighter than a pattern on the other side (see FIG. 16). Regardless of which case, a sub-pixel in a sub-pixel column adjacent to the feature vertical line is used as the correction sub-pixel, which may avoid the poor display effect caused by the too narrow feature vertical line or the brightness reduction of the vertical line.

In some embodiments of the present disclosure, a color of the feature vertical line may be the same as or different from colors of the patterns on both sides. In an example, colors on both sides of the feature vertical line may be the same, in particular, both colors and gray scales of the pixels may be the same, which makes the feature vertical line be a vertical line in a solid color pattern.

In some embodiments of the present disclosure, colors and gray scales of individual pixels (that is, individual second feature pixels PA2) of the feature vertical line are the same. In other words, the feature vertical line may be a solid color vertical line of equal brightness.

In an embodiment of the present disclosure, in the first feature pattern area TAA, pre-correction gray scales of individual sub-pixels of the same feature pixel are the same. In other words, individual pixels in the first feature pattern area TAA display a gray pattern, so that the first feature pattern area TAA is particularly suitable for processing for a black-and-white pattern.

It can be understood that the above-mentioned adjustment manner for the first feature pattern area is only an implementation of the present disclosure. For example, in another embodiment of the present disclosure, when it is defined that gray scales of individual sub-pixels of the first feature pixel are the same, gray scales of individual sub-pixels of the second feature pixel are the same, and gray scales of individual sub-pixels of the third feature pixel are the same, that is, when the first feature pattern area is defined as a gray pattern, the reference sub-pixel of the first correction sub-pixel and the reference sub-pixel of the second correction sub-pixel may also be other sub-pixels when the first feature pattern area is adjusted. For example, the reference sub-pixel of the first correction sub-pixel may be any one or more sub-pixels in the second feature pixel adjacent to the first correction sub-pixel, or a sub-pixel located in the second feature pixel and adjacent to the first correction sub-pixel. For another example, the reference sub-pixel of the second correction sub-pixel may be any one or more sub-pixels located in the second feature pixel adjacent to the second correction sub-pixel, or a sub-pixel located in the second feature pixel and adjacent to the second correction sub-pixel.

In an embodiment of the present disclosure, the number of first feature pixel groups PA in the first feature pattern area TAA is greater than or equal to a first number threshold. In other words, if the number of pixels of the vertical line (the number of pixel rows occupied by the vertical line in the column direction) does not reach the first number threshold, the vertical line will not be determined whether it belongs to the first feature pattern area TAA. This is because when the number of pixels in the vertical line is small, the jagged feeling produced is not obvious, and a good display effect can be maintained without the gray scale transition correction. In some embodiments of the present disclosure, the first number threshold may be determined based on prior detection, especially in combination with an actual usage scenario of the display device and the corresponding detection. In some embodiments of the present disclosure, the first number threshold is a positive integer greater than or equal to 3, especially a positive integer greater than or equal to 5, which may be, for example, one of 5, 6, 7, 8, 9, and 10.

In an embodiment of the present disclosure, the first number threshold may be acquired through testing. For example, a picture containing the light-dark vertical demarcation line may be viewed in a preset environment, such as at a preset distance (e.g., 0.5 m) from the display panel (e.g., the liquid crystal display panel) PNL, at a preset viewing angle (e.g., directly in front), and the first number threshold are adjusted so as to make jaggedness of the light-dark vertical demarcation line disappear or the degree of visibility thereof reduced to an acceptable level.

In some embodiments of the present disclosure, the feature pattern area includes the second feature pattern area. In other words, the second feature pattern area as the feature pattern area may be acquired and adjusted.

Figure 17:
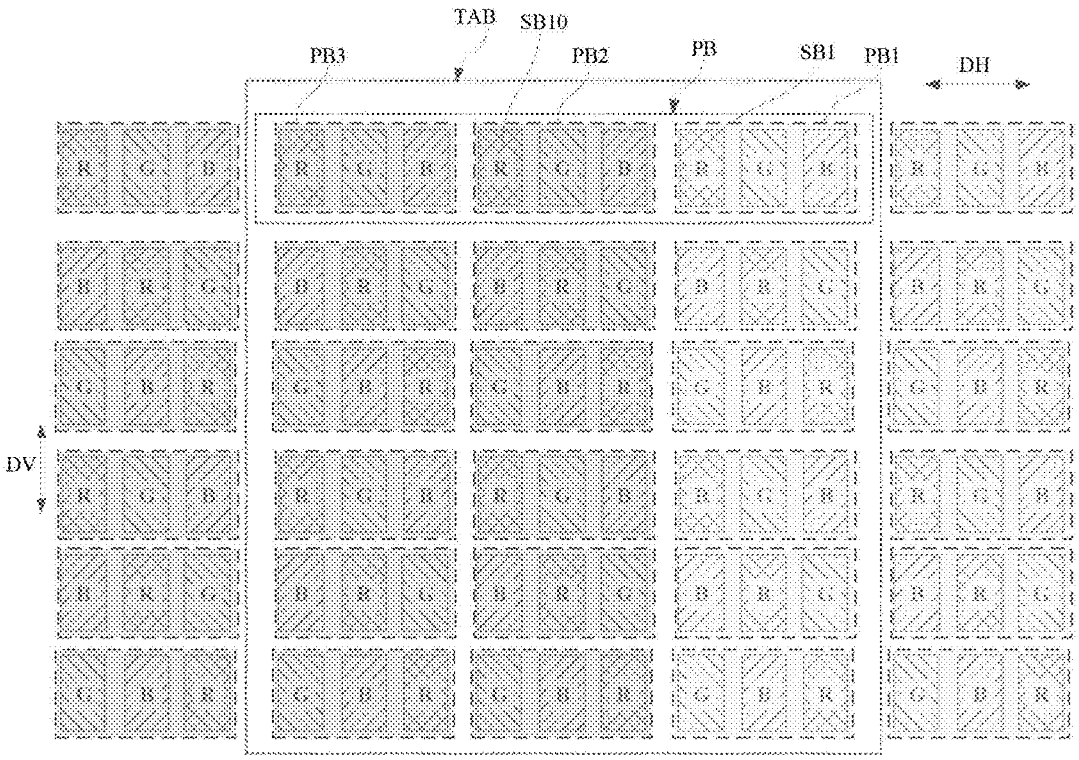
FIG. 17 illustrates a schematic diagram of a second feature pattern area in an embodiment of the present disclosure.

Referring to FIG. 17, a second feature pattern area TAB includes a plurality of second feature pixel groups PB sequentially arranged along the column direction DV. The second feature pixel group PB includes a fourth feature pixel PB1, a fifth feature pixel PB2, and a sixth feature pixel PB3 sequentially adjacent in the same row. A brightness difference between the fourth feature pixel PB1 and the fifth feature pixel PB2 is greater than or equal to the brightness threshold Lset, and a brightness difference between the fifth feature pixel PB2 and the sixth feature pixel PB3 is less than the brightness threshold Lset. Individual fourth feature pixels PB1 are arranged in the same column.

When the second feature pattern area is adjusted, according to the arrangement mode of the sub-pixels on the display panel, a sub-pixel SP of the fourth feature pixel PB1 close to the fifth feature pixel PB2 is used as a third correction sub-pixel SB1 for the gray scale transition correction. Gx(SB1) is between G(SB1) and G(SB10), where Gx(SB1) is a corrected gray scale of the third correction sub-pixel SB1, G(SB1) is a pre-correction gray scale of the third correction sub-pixel SB1, and G(SB10) is a gray scale of a reference sub-pixel SB10 of the third correction sub-pixel. The reference sub-pixel SB10 of the third correction sub-pixel is a sub-pixel SP located in the fifth feature pixel PB2 adjacent to the third correction sub-pixel SB1 and having the same color as the third correction sub-pixel SB1.

The liquid crystal display panel PNL is driven according to the corrected gray scale of the third correction sub-pixel SB1.

In this embodiment, when there is the second feature pattern area TAB in the picture data, a pixel column where the fifth feature pixel PB2 in the second feature pattern area TAB is located and a pixel column where the fourth feature pixel PB1 in the second feature pattern area TAB is located have a relatively large brightness difference, which makes a side of a line displayed by the pixel column where the fifth feature pixel PB2 is located that is close to the fourth feature pixel PB1 have a relatively obvious jagged feeling. In this embodiment, the gray scale transition correction is performed on the third correction sub-pixel SB1, so as to reduce the brightness difference between the fourth feature pixel PB1 and the fifth feature pixel PB2 and improve the smoothness of the line displayed by the pixel column where the fifth feature pixel PB2 is located. A brightness difference between the fifth feature pixel PB2 and the sixth feature pixel PB3 is relatively small, which will not cause the jagged feeling or generate a very low jagged feeling. Therefore, there is no need to perform the gray scale transition correction on the sub-pixel SP of the sixth feature pixel PB3.

Figure 18:
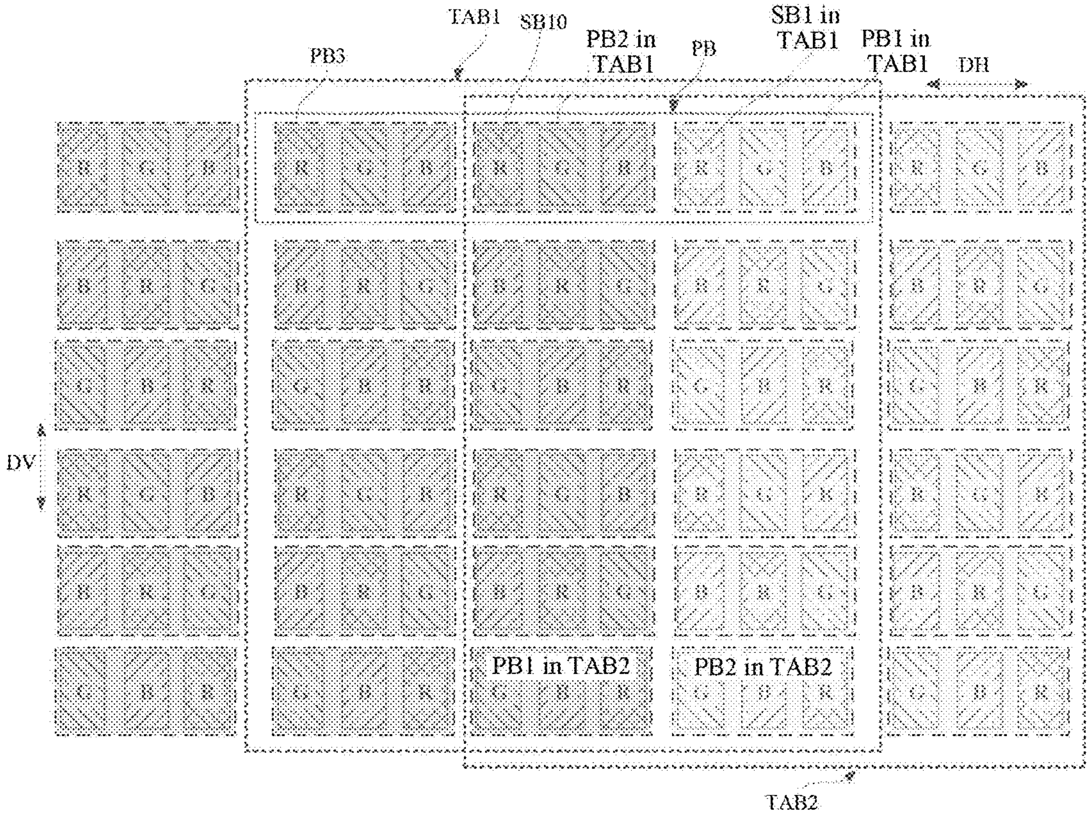
FIG. 18 illustrates a schematic diagram of a second feature pattern area group in an embodiment of the present disclosure.
Figure 19:
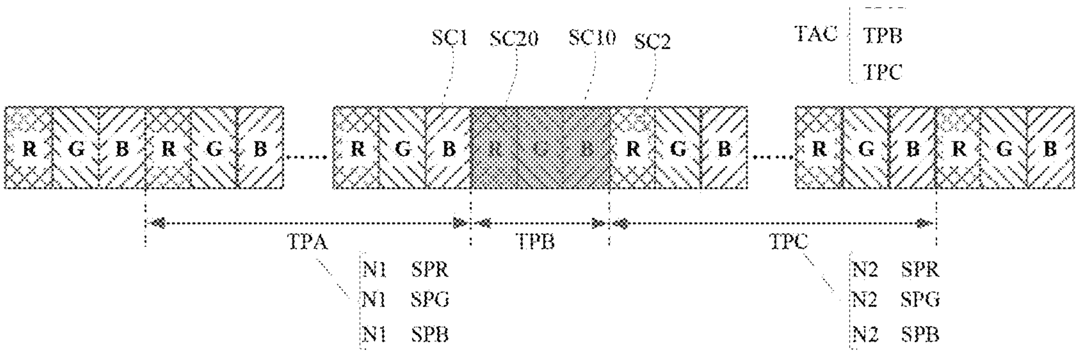
FIG. 19 illustrates a schematic diagram of a third feature pattern area in an embodiment of the present disclosure.

In some examples, the display device is further configured to determine whether there is a second feature pattern area group, and the second feature pattern area group is composed of two second feature pattern areas. Referring to FIG. 18, one of the second feature pattern areas may be used as a selected second feature pattern area TAB1 and the other second feature pattern area may be used as an auxiliary second feature pattern area TAB2. A fourth feature pixel PB1 of the selected second feature pattern area TAB1 is a fifth feature pixel PB2 of the auxiliary second feature pattern area TAB2, and a fifth feature pixel PB2 of the selected second feature pattern area TAB1 is a fourth feature pixel PB1 of the auxiliary second feature pattern area TAB2. A gray scale of the fourth feature pixel PB1 is greater than a gray scale of the fifth feature pixel PB2 in the selected second feature pattern area TAB1. Therefore, the two second feature pattern areas share the same two pixel columns and have the same length in the column direction in the second feature pattern area group.

When there is the second feature pattern area group, the gray scale transition correction is performed on the third correction sub-pixel SB1 of the selected second feature pattern area TAB1, and the gray scale transition correction is not performed on the third correction sub-pixel SB1 of the auxiliary second feature pattern area TAB2. In this way, a vertical demarcation line between color block patterns can be corrected to eliminate the jagged feeling of the vertical demarcation line. When the correction is performed, a gray scale of a sub-pixel, closest to the smaller brightness side, of a pixel on the larger brightness side, is reduced. For example, in a final effect, the gray scale transition correction is performed, at a vertical demarcation line between a bright color block pattern and a dark color block pattern, on a pixel column at the bright color block pattern side, to weaken or eliminate the jagged feeling at the vertical demarcation line between the bright color block pattern and the dark color block pattern.

In some examples, the transition correction unit is further configured to determine whether there is the second feature pattern area group. The second feature pattern area group includes the selected second feature pattern area TAB1 and the auxiliary second feature pattern area TAB2. The fourth feature pixel PB1 of the selected second feature pattern area TAB1 is the fifth feature pixel PB2 of the auxiliary second feature pattern area TAB2, and the fifth feature pixel PB2 of the selected second feature pattern area TAB1 is the fourth feature pixel PB1 of the auxiliary second feature pattern area TAB2. The gray scale of the fourth feature pixel PB1 is greater than the gray scale of the fifth feature pixel PB2 in the selected second feature pattern area TAB1.

When there is the second feature pattern area group, the gray scale transition correction is performed on the third correction sub-pixel SB1 of the selected second feature pattern area TAB1, and the gray scale transition correction is not performed on the third correction sub-pixel SB1 of the auxiliary second feature pattern area TAB2. In this way, a vertical demarcation line between color block patterns can be corrected to eliminate the jagged feeling of the vertical demarcation line. When the correction is performed, a gray scale of a sub-pixel, closest to the smaller brightness side, of a pixel on the larger brightness side, is reduced. For example, in a final effect, the gray scale transition correction is performed, at a vertical demarcation line between a bright color block pattern and a dark color block pattern, on a pixel column at the bright color block pattern side, to weaken or eliminate the jagged feeling at the vertical demarcation line between the bright color block pattern and the dark color block pattern.

In some examples, in the step S130, it may also be determined whether there is the second feature pattern area group. The second feature pattern area group includes the selected second feature pattern area TAB1 and the auxiliary second feature pattern area TAB2. The fourth feature pixel PB1 of the selected second feature pattern area TAB1 is the fifth feature pixel PB2 of the auxiliary second feature pattern area TAB2, and the fifth feature pixel PB2 of the selected second feature pattern area TAB1 is the fourth feature pixel PB1 of the auxiliary second feature pattern area TAB2. The gray scale of the fourth feature pixel PB1 is greater than the gray scale of the fifth feature pixel PB2 in the selected second feature pattern area TAB1.

When there is the second feature pattern area group, the gray scale transition correction is performed on the third correction sub-pixel SB1 of the selected second feature pattern area TAB1, and the gray scale transition correction is not performed on the third correction sub-pixel SB1 of the auxiliary second feature pattern area TAB2. In this way, a vertical demarcation line between color block patterns can be corrected to eliminate the jagged feeling of the vertical demarcation line. When the correction is performed, a gray scale of a sub-pixel, closest to the smaller brightness side, of a pixel on the larger brightness side, is reduced. For example, in a final effect, the gray scale transition correction is performed, at a vertical demarcation line between a bright color block pattern and a dark color block pattern, on a pixel column at the bright color block pattern side, to weaken or eliminate the jagged feeling at the vertical demarcation line between the bright color block pattern and the dark color block pattern.

In an embodiment of the present disclosure, pre-correction gray scales of individual sub-pixels of the same pixel (the feature pixel) are the same in the second feature pattern area TAB. In other words, a pattern in the second feature pattern area TAB may be a gray pattern, such as a black-and-white pattern.

In an embodiment of the present disclosure, if both the first feature pattern area TAA and the second feature pattern area TAB are used as the feature pattern areas for adjustment, then when the feature pattern area is acquired, the first feature pattern area TAA and the second feature pattern area TAB may be acquired successively or simultaneously. For example, after the first feature pattern area TAA is acquired according to the ordered (i.e., post-adjusting) picture data, the second feature pattern area TAB is acquired from outside the first feature pattern area TAA. For another example, the first feature pattern area TAA and the second feature pattern area TAB may be acquired simultaneously from the ordered picture data.

It can be understood that the above-mentioned adjustment manner for the second feature pattern area is only an implementation of the present disclosure. For example, in another embodiment of the present disclosure, when it is defined that gray scales of individual sub-pixels of the fourth feature pixel are the same, gray scales of individual sub-pixels of the fifth feature pixel are the same, and gray scales of individual sub-pixels of the sixth feature pixel are the same, that is, when the second feature pattern area is defined as a gray pattern, the reference sub-pixel of the third correction sub-pixel may also be another sub-pixel when the second feature pattern area is adjusted. For example, the reference sub-pixel of the third correction sub-pixel may be any one or more sub-pixels located in the fifth feature pixel adjacent to the third correction sub-pixel, or a sub-pixel located in the fifth feature pixel and adjacent to the third correction sub-pixel.

In an embodiment of the present disclosure, the number of second feature pixel groups PB in the second feature pattern area TAB is greater than or equal to a second number threshold. In other words, if the number of pixels of the vertical line (the number of rows occupied by the vertical line in the column direction) does not reach the second number threshold, then the vertical line will not be determined whether it belongs to the second feature pattern area TAB. This is because when the number of pixels in the vertical line is small, the jagged feeling produced is not obvious, and a good display effect can be maintained without the gray scale transition correction. In some embodiments of the present disclosure, the second number threshold may be determined based on prior detection, especially in combination with an actual usage scenario of the display device and the corresponding detection. In some embodiments of the present disclosure, the second number threshold is a positive integer greater than or equal to 3, especially a positive integer greater than or equal to 5, which may be, for example, one of 5, 6, 7, 8, 9, and 10.

In an example, the second number threshold and the first number threshold are the same, for example, both are 5.

In some embodiments of the present disclosure, the feature pattern area may include the third feature pattern area. In other words, the third feature pattern area as the feature pattern area may be acquired and adjusted.

Referring to FIGS. 19 to 22, a third feature pattern area TAC includes a first sub-pixel group TPA, a second sub-pixel group TPB and a third sub-pixel group TPC sequentially adjacent along a row direction DH. The second sub-pixel group TPB includes three sub-pixels SP sequentially adjacent along the row direction DH, and the first sub-pixel group TPA and the third sub-pixel group TPC each include a plurality of sub-pixels SP sequentially adjacent along the row direction DH. In the first sub-pixel group TPA, gray scales of individual same-color sub-pixels SP are the same, and the number of sub-pixels SP in any the same color is N1. In the third sub-pixel group TPC, gray scales of individual same-color sub-pixels SP are the same, and the number of sub-pixels SP in any the same color is N2. N1 and N2 are both positive integers from 1 to 1000. A brightness difference between the second sub-pixel group TPB and a pixel in the first sub-pixel group TPA is greater than or equal to the brightness threshold Lset, and a brightness difference between the second sub-pixel group TPB and a pixel in the third sub-pixel group TPC is greater than or equal to the brightness threshold Lset.

In some other embodiments of the present disclosure, the third feature pattern area TAC includes the first sub-pixel group TPA, the second sub-pixel group TPB and the third sub-pixel group TPC sequentially adjacent along the row direction DH. The first sub-pixel group TPA includes K1 sub-pixels SP sequentially adjacent along the row direction DH, and gray scales of individual sub-pixels SP are the same in the first sub-pixel group TPA, where K1 is a positive integer from 3 to 3000. The third sub-pixel group TPC includes K2 sub-pixels SP sequentially adjacent along the row direction DH, and gray scales of individual sub-pixels SP are the same in the third sub-pixel group TPC, where K2 is a positive integer from 3 to 3000. A brightness difference between the second sub-pixel group TPB and a pixel in the first sub-pixel group TPA is greater than or equal to the brightness threshold Lset, and a brightness difference between the second sub-pixel group TPB and a pixel in the third sub-pixel group TPC is greater than or equal to the brightness threshold Lset. In this case, the first sub-pixel group TPA and the third sub-pixel group TPC display gray patterns. For example, in this case, gray scales of individual sub-pixels in the second sub-pixel group TPB are the same.

In some embodiments of the present disclosure, K1 and K2 are both integers not exceeding 300, for example, integers not exceeding 150, especially integers not exceeding 60. In an embodiment of the present disclosure, K1 and K2 are both positive integers from 9 to 30. When values of K1 and K2 are too small, two intersected curves or oblique lines may appear visually bold near the intersection position, and the visual impression is not ideal. When the values of K1 and K2 are too large, the number of patterns that can be adjusted will be too small, which will reduce an overall improvement effect, and lead to the missing of a pattern that can be adjusted. It can be understood that the three sub-pixels in the second sub-pixel group TPB may belong to the same pixel on the display panel, or may belong to two adjacent pixels on the display panel.

Referring to FIGS. 19 to 22, when the third feature pattern area is adjusted, according to the arrangement structure of the sub-pixels on the display panel, a sub-pixel SP in the first sub-pixel group TPA close to the second sub-pixel group TPB is used as a fourth correction sub-pixel SC1 for the gray scale transition correction, and a sub-pixel SP in the third sub-pixel group TPC close to the second sub-pixel group TPB is used as a fifth correction sub-pixel SC2 for the gray scale transition correction. Gx(SC1) is between G(SC1) and G(SC10), where Gx(SC1) is a corrected gray scale of the fourth correction sub-pixel SC1, G(SC1) is a pre-correction gray scale of the fourth correction sub-pixel SC1, and G(SC10) is a gray scale of a reference sub-pixel SC10 of the fourth correction sub-pixel. The reference sub-pixel SC10 of the fourth correction sub-pixel is a sub-pixel SP in the second sub-pixel group TPB that has the same color as the fourth correction sub-pixel SC1. Gx(SC2) is between G(SC2) and G(SC20), where Gx(SC2) is a corrected gray scale of the fifth correction sub-pixel SC2, G(SC2) is a pre-correction gray scale of the fifth correction sub-pixel SC2, and G(SC20) is a gray scale of a reference sub-pixel SC20 of the fifth correction sub-pixel. The reference sub-pixel SC20 of the fifth correction sub-pixel is a sub-pixel SP in the second sub-pixel group TPB that has the same color as the fifth correction sub-pixel SC2.

When the liquid crystal display panel PNL is driven, the liquid crystal display panel PNL is driven according to the corrected gray scales of the fourth correction sub-pixel SC1 and the fifth correction sub-pixel SC2.

In some examples, the display device is configured such that, in a case that the feature pattern area includes the first feature pattern area and the third feature pattern area, if a pixel satisfies both the first feature pattern area and the third feature pattern area, then the pixel belongs to the first feature pattern area.

In some examples, the feature pattern area acquisition unit is further configured such that, in a case that the feature pattern area includes the first feature pattern area and the third feature pattern area, if a pixel satisfies both the first feature pattern area and the third feature pattern area, then the pixel belongs to the first feature pattern area.

In some examples, in the step S120, in a case that the feature pattern area includes the first feature pattern area and the third feature pattern area, if a pixel satisfies both the first feature pattern area and the third feature pattern area, then the pixel belongs to the first feature pattern area.

In an example, the first feature pattern area TAA may be acquired first, and then the third feature pattern area TAC may be acquired, the second sub-pixel group TPB does not intersect with the first feature pattern area TAA. In this way, the repeated gray scale transition correction on the same pixel or sub-pixel may be avoided. For example, when a pixel may be divided into the first feature pattern area TAA, the pixel is preferentially divided into the first feature pattern area TAA, thereby ensuring that the feature vertical line in the initial picture can be fully acquired.

It can be understood that the first feature pattern area TAA includes a plurality of adjacent first feature pixel groups PA in the same column, that is, the gray scale transition correction based on the first feature pattern area TAA is a correction for a plurality of pixel rows. The third feature pattern area TAC includes a plurality of adjacent sub-pixels in the same row, and the gray scale transition correction based on the third feature pattern area TAC is pixel transition correction for a dot pattern, and the corrected sub-pixels are located in the same row.

In this embodiment, when the third feature pattern area TAC is found, the second sub-pixel group TPB used to display the dot pattern may be expanded by one sub-pixel to both sides (in the row direction) to display the dot pattern, and the gray scale transition correction is performed on the expanded sub-pixel as the correction sub-pixel. For example, the first sub-pixel group TPA and the third sub-pixel group TPC on both sides of the second sub-pixel group TPB may both have solid color patterns, and thus borrowing a sub-pixel located on the edge respectively from the first sub-pixel group TPA and the third sub-pixel group TPC will not reduce the display effect, but will make the display of the dot pattern clearer. In this embodiment, when dot patterns displayed by some second sub-pixel groups TPB are connected to each other to form an oblique line or a curve, edges of the oblique line or the curve may also be compensated to eliminate or weaken the jagged feeling of the edges of the oblique line or the curve. Not only that, while the smoothness of the curve or the oblique line is increased, the oblique line or the curve may also be widened, thereby increasing the brightness of the oblique line or the curve.

In some embodiments of the present disclosure, the solid color pattern means that colors and brightness of individual pixels making up the pattern are the same. Specifically, gray scale data of the pixels making up the pattern are the same. In the solid color pattern, gray scales of individual red sub-pixels are the same, gray scales of individual green sub-pixels are the same, and gray scales of individual blue sub-pixels are the same. The solid color pattern may be a solid color pattern with a single-color sub-pixel emitting light, which may be, for example, a red pattern, a green pattern, or a blue pattern. Alternatively, the solid color pattern may be a solid color pattern with multi-color sub-pixels emitting light, which may be, for example, a purple pattern, a magenta pattern, a cyan pattern, a white pattern or a gray pattern. Alternatively, the solid color pattern may be a black pattern in which each sub-pixel does not emit light.

In some other embodiments of the present disclosure, the solid color pattern may also mean that the colors and brightness of the individual pixels making up the pattern are similar. A criterion for judging "similarity" is that for a human eye, there is no obvious transition between different portions in an image directly displayed in the initial picture. In this way, the first sub-pixel group TPA may include a plurality of similar pixels, and data (colors and gray scales) of individual pixels is similar. For the human eye, there is no obvious transition between different portions of the first sub-pixel group in the image directly displayed in the initial picture. The third sub-pixel group TPA may include a plurality of similar pixels, and data (colors and gray scales) of individual pixels is similar. For the human eye, there is no obvious transition between different portions of the third sub-pixel group in the image directly displayed in the initial picture. In this way, without departing from the main purpose and intention of the present disclosure, it is possible to expand an application range of the first sub-pixel group and the third sub-pixel group so as to expand an application range of the third feature pattern area, which realizes the better display effect.

It can be understood that the above-mentioned adjustment manner for the third feature pattern area is only an implementation of the present disclosure. For example, in another embodiment of the present disclosure, when it is defined that gray scales of individual sub-pixels of the second sub-pixel group of the third feature pattern area are the same, the reference sub-pixel of the fourth correction sub-pixel is not necessarily the sub-pixel in the second sub-pixel group that has the same color as the fourth correction sub-pixel. For example, the reference sub-pixel of the fourth correction sub-pixel may be any one or more sub-pixels located in the second sub-pixel group, or a sub-pixel located in the second sub-pixel group and adjacent to the fourth correction sub-pixel. For another example, when it is defined that gray scales of individual sub-pixels of the second sub-pixel group of the third feature pattern area are the same, the reference sub-pixel of the fifth correction sub-pixel is not necessarily the sub-pixel in the second sub-pixel group that has the same color as the fifth correction sub-pixel. For example, the reference sub-pixel of the fifth correction sub-pixel may be any one or more sub-pixels located in the second sub-pixel group, or a sub-pixel located in the second sub-pixel group and adjacent to the fifth correction sub-pixel.

It can be understood that the above-mentioned adjustment manner for the third feature pattern area is only an implementation of the present disclosure. In this implementation, the second sub-image group is defined to be composed of three sub-pixels. In other embodiments of the present disclosure, the second sub-pixel group may also be composed of more sub-pixels. For example, in another implementation, the second sub-pixel group includes 3 to 5 sub-pixels, and gray scales of individual sub-pixels are the same. In this case, it is not necessarily required that the numbers of sub-pixels in any two second sub-pixel groups are the same. For example, some second sub-pixel groups may include 3 sub-pixels, some second sub-pixel groups may include 4 sub-pixels, and some second sub-pixel groups may include 5 sub-pixels. In this embodiment, the reference sub-pixel of the fourth correction sub-pixel may be any one or more sub-pixels located in the second sub-pixel group, or a sub-pixel located in the second sub-pixel group and adjacent to the fourth correction sub-pixel. The reference sub-pixel of the fifth correction sub-pixel may be any one or more sub-pixels located in the second sub-pixel group, or a sub-pixel located in the second sub-pixel group and adjacent to the fifth correction sub-pixel.

Alternatively, based on the inventive concept and means of the present disclosure, in other embodiments of the present disclosure, other types of modifications may also be made to the definition and the adjustment manner for the third feature pattern area, as long as the similar effect can be achieved. For example, the second sub-pixel group TPB may also have three or more sub-pixels, for example, it may have 4, 5 or 6 sub-pixels. For example, the second sub-pixel group TPB may have 3-6 sub-pixels. For example, the second sub-pixel group TPB may have 3-5 sub-pixels. In this way, only when the second sub-pixel group TPB is greater than or equal to one pixel width and less than two pixel widths, the brightness of at least some pixels of the feature pattern area is adjusted, which has a better improvement effect. For example, a line processed in this way has a more ideal look and feel.

Figure 20:
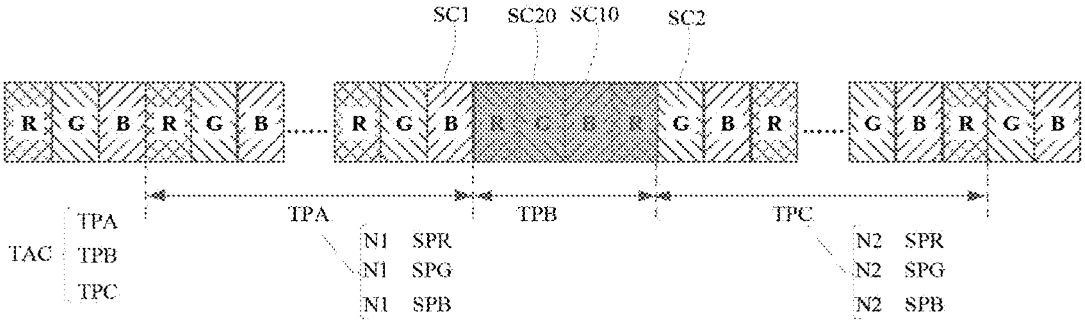
FIG. 20 illustrates a schematic diagram of a third feature pattern area in an embodiment of the present disclosure.
Figure 21:
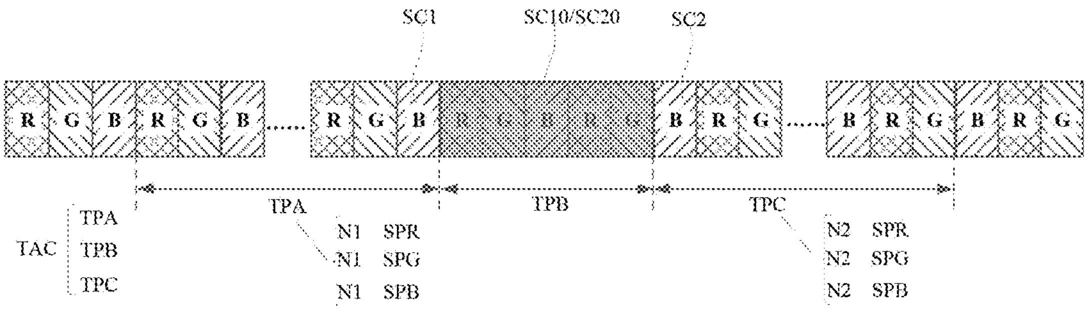
FIG. 21 illustrates a schematic diagram of a third feature pattern area in an embodiment of the present disclosure.
Figure 22:
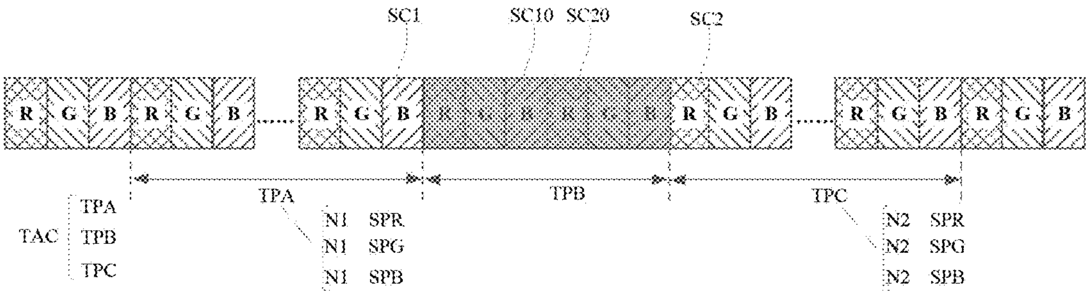
FIG. 22 illustrates a schematic diagram of a third feature pattern area in an embodiment of the present disclosure.

FIG. 20 illustrates a case where the second sub-pixel group TPB has four sub-pixels, FIG. 21 illustrates a case where the second sub-pixel group TPB has five sub-pixels, and FIG. 22 illustrates a case where the second sub-pixel group TPB has six sub-pixels. In an example, when the number of sub-pixels in the second sub-pixel group TPB is more than 3, an average pixel brightness of the second sub-pixel group TPB may be used as the brightness of the second sub-pixel group TPB, for example, $(3/M)*\Sigma Lsp$ may be used as the brightness of the second sub-pixel group TPB, where M represents the number of sub-pixels in the second sub-pixel group TPB, and $\Sigma Lsp$ represents the sum of the brightness of individual pixels in the second sub-pixel group TPB. In this way, in embodiments of the present disclosure, the gray scale transition correction may be performed on a wider dot pattern, further improving the display effect. Especially when the display panel displays a straight line with a small slope, some dots of the straight line may need to be displayed through 4 to 6 sub-pixels to appear continuous and clear. In this example, the gray scale transition correction may be performed on these dot patterns to eliminate the jagged feeling that the straight line may have.

In another embodiment of the present disclosure, the second sub-pixel group TPB has no less than 3 sub-pixels. When the second sub-pixel group TPB has two or more sub-pixels with the same color as the fourth correction sub-pixel SC1, the reference sub-pixel of the fourth correction sub-pixel SC1 may be a sub-pixel in the second sub-pixel group TPB that has the same color as the fourth correction sub-pixel SC1 and is closest to the fourth correction sub-pixel SC1. Correspondingly, when the second sub-pixel group TPB has two or more sub-pixels with the same color as the fifth correction sub-pixel SC2, the reference sub-pixel of the fifth correction sub-pixel SC2 may be a sub-pixel in the second sub-pixel group TPB that has the same color as the fifth correction sub-pixel SC2 and is closest to the fifth correction sub-pixel SC2.

In another embodiment of the present disclosure, the second sub-pixel group TPB has no less than 3 sub-pixels. When the second sub-pixel group TPB has two or more sub-pixels with the same color as the fourth correction sub-pixel SC1, the reference sub-pixel of the fourth correction sub-pixel SC1 may be any sub-pixel in the second sub-pixel group TPB that has the same color as the fourth correction sub-pixel SC1. Correspondingly, when the second sub-pixel group TPB has two or more sub-pixels with the same color as the fifth correction sub-pixel SC2, the reference sub-pixel of the fifth correction sub-pixel SC2 may be any sub-pixel in the second sub-pixel group TPB that has the same color as the fifth correction sub-pixel SC2. For example, when the second sub-pixel group TPB has two or more sub-pixels with the same color as the fourth correction sub-pixel SC1, and gray scales of the two or more sub-pixels that have the same color as the fourth correction sub-pixel SC1 are the same, the reference sub-pixel of the fourth correction sub-pixel SC1 may be any one or more sub-pixels in the second sub-pixel group TPB that have the same color as the fourth correction sub-pixel SC1. For example, when the second sub-pixel group TPB has two or more sub-pixels with the same color as the fifth correction sub-pixel SC2, and gray scales of the two or more sub-pixels that have the same color as the fifth correction sub-pixel SC2 are the same, the reference sub-pixel of the fifth correction sub-pixel SC2 may be any one or more sub-pixels in the second sub-pixel group TPB that have the same color as the fifth correction sub-pixel SC2.

In another embodiment of the present disclosure, the second sub-pixel group TPB has no less than 3 sub-pixels. When the second sub-pixel group TPB has two or more sub-pixels with the same color as the fourth correction sub-pixel SC1, a gray scale of the reference sub-pixel of the fourth correction sub-pixel SC1 may be an average of gray scales of individual sub-pixels in the second sub-pixel group TPB that have the same color as the fourth correction sub-pixel SC1. In this case, the reference sub-pixel of the fourth correction sub-pixel SC1 is a virtual sub-pixel instead of a physical sub-pixel, and a gray scale of the virtual sub-pixel is an average of gray scales of same-color sub-pixels in the second sub-pixel group TPB. Correspondingly, when the second sub-pixel group TPB has two or more sub-pixels with the same color as the fifth correction sub-pixel SC2, a gray scale of the reference sub-pixel of the fifth correction sub-pixel SC2 may be an average of gray scales of individual sub-pixels in the second sub-pixel group TPB that have the same color as the fifth correction sub-pixel SC2. In this case, the reference sub-pixel of the fifth correction sub-pixel SC2 is a virtual sub-pixel instead of a physical sub-pixel, and a gray scale of the virtual sub-pixel is an average of gray scales of same-color sub-pixels in the second sub-pixel group TPB.

In another embodiment of the present disclosure, the second sub-pixel group TPB has no less than 3 sub-pixels. When the second sub-pixel group TPB has two or more sub-pixels with the same color as the fourth correction sub-pixel SC1, a brightness of the reference sub-pixel of the fourth correction sub-pixel SC1 may be an average of the brightness of individual sub-pixels in the second sub-pixel group TPB that have the same color as the fourth correction sub-pixel SC1. In this case, the reference sub-pixel of the fourth correction sub-pixel SC1 is a virtual sub-pixel instead of a physical sub-pixel, a brightness of the virtual sub-pixel is an average of the brightness of same-color sub-pixels in the second sub-pixel group TPB, and the gray scale of the virtual sub-pixel is a gray scale corresponding to its brightness. In other words, the brightness corresponding to the gray scale of the reference sub-pixel of the fourth correction sub-pixel SC1 is the average of the brightness of individual same-color sub-pixels in the second sub-pixel group TPB. Correspondingly, when the second sub-pixel group TPB has two or more sub-pixels with the same color as the fifth correction sub-pixel SC2, a brightness of the reference sub-pixel of the fifth correction sub-pixel SC2 may be an average of the brightness of individual sub-pixels in the second sub-pixel group TPB that have the same color as the fifth correction sub-pixel SC2. In this case, the reference sub-pixel of the fifth correction sub-pixel SC2 is a virtual sub-pixel instead of a physical sub-pixel, a brightness of the virtual sub-pixel is an average of the brightness of same-color sub-pixels in the second sub-pixel group TPB, and the gray scale of the virtual sub-pixel is a gray scale corresponding to its brightness. In other words, the brightness corresponding to the gray scale of the reference sub-pixel of the fifth correction sub-pixel SC2 is the average of the brightness of individual same-color sub-pixels in the second sub-pixel group TPB. It can be understood that in embodiments of the present disclosure, a pixel brightness of a sub-pixel group is an average pixel brightness of the sub-pixel group, rather than the sum of the brightness of individual sub-pixels in the sub-pixel group.

In an embodiment of the present disclosure, pre-correction gray scales of individual sub-pixels of the same pixel in the first sub-pixel group TPA are the same. In other words, the pixel in the first sub-pixel group TPA may be a gray pixel.

In an embodiment of the present disclosure, pre-correction gray scales of individual sub-pixels of the same pixel in the third sub-pixel group TPC are the same. In other words, the pixel in the third sub-pixel group TPC may be a gray pixel.

In some embodiments of the present disclosure, a plurality of third feature pattern areas TAC may be sequentially adjacent along the column direction DV, and there are two adjacent third feature pattern areas TAC, among the plurality of third feature pattern areas TAC, arranged in a staggered manner. The staggered arrangement of the two adjacent third feature pattern areas TAC can be understood as that the two adjacent third feature pattern areas TAC are located in two adjacent rows, and only some sub-pixels are located in the same pixel column. In this way, these third feature pattern areas TAC may form an oblique line or a curve. In embodiments of the present disclosure, the gray scale transition correction for the correction sub-pixels of individual third feature pattern areas TAC can weaken or eliminate the jagged feeling at an edge of the oblique line or the curve.

Figure 9:
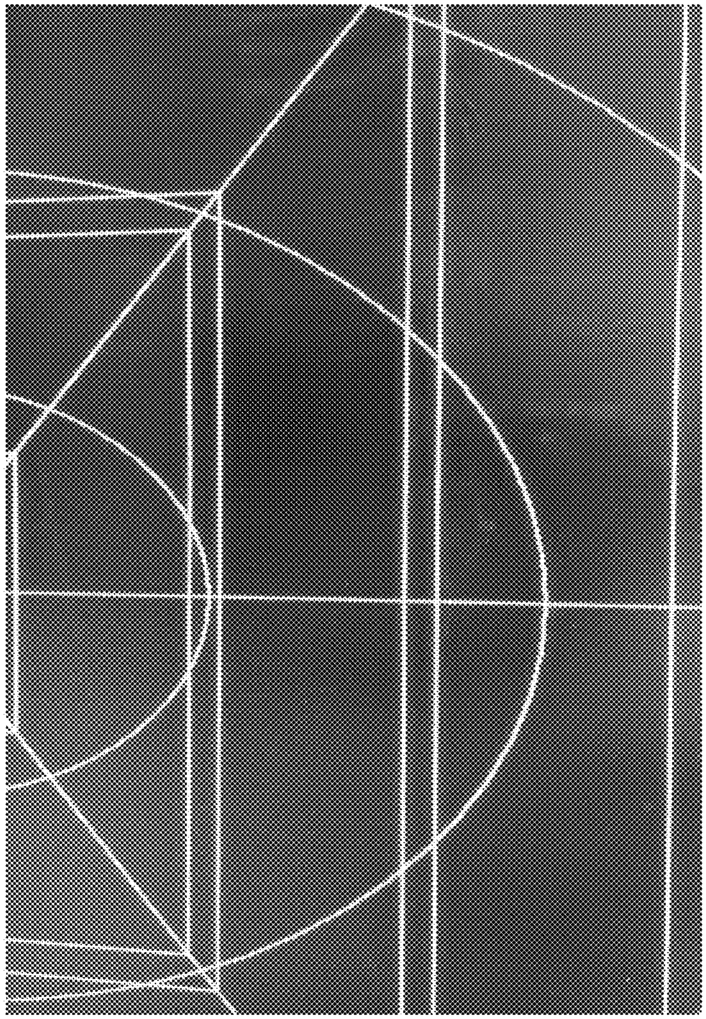
FIG. 9 illustrates a schematic diagram of a display effect of an oblique line pattern and a curve pattern in an embodiment of the present disclosure.

In embodiments of the present disclosure, by setting N1 and N2, interference between different patterns can be avoided. By setting N1 and N2 of reasonable magnitudes, the display effect of the dot pattern and the oblique line or curve composed of dot patterns are improved without introducing a new abnormality. N1 and N2 are both integers not exceeding 100, for example, integers not exceeding 50, especially integers not exceeding 20. In an embodiment of the present disclosure, N1 and N2 are both positive integers from 3 to 10. When values of N1 and N2 are too small, two intersected curves or oblique lines may appear visually bold near the intersection position, and the visual impression is not ideal. When the values of N1 and N2 are too large, the number of patterns that can be adjusted will be too small, which will reduce an overall improvement effect, and lead to the missing of a pattern that can be adjusted. FIG. 9 illustrates an optimization effect of an oblique line and a curve in this embodiment. It can be seen from FIG. 9 that by adjusting the third feature pattern area using embodiments of the present disclosure, the oblique line and the curve can be smoothed without any obvious jagged feeling.

In some embodiments of the present disclosure, N1 and N2 may be the same or different. In an example, both N1 and N2 are 5.

In embodiments of the present disclosure, after the feature pattern area is acquired, the corrected gray scale of each correction sub-pixel may be determined according to the feature pattern area. For example, after the first feature pattern area TAA is acquired, the corrected gray scales of the first correction sub-pixel SA1 and the second correction sub-pixel SA2 may be determined; after the second feature pattern area TAB is acquired, the corrected gray scale of the third correction sub-pixel SB1 may be determined; and after the third feature pattern area TAC is obtained, the corrected gray scales of the fourth correction sub-pixel SC1 and the fifth correction sub-pixel SC2 may be determined. Specifically, the corrected gray scale of the correction sub-pixel is between the pre-correction gray scale of the correction sub-pixel and the gray scale of the reference sub-pixel of the correction sub-pixel. For example, according to a predetermined weighting method, the corrected gray scale of the correction sub-pixel is determined based on the pre-correction gray scale of the correction sub-pixel and the gray scale of the reference sub-pixel of the correction sub-pixel.

In some embodiments of the present disclosure, when the corrected gray scale of the correction sub-pixel is determined, $$Gx\text{-}round[G(L)+\beta*(G(H)-G(L))],$$

where Gx is the corrected gray scale of the correction sub-pixel, G(L) is the smaller gray scale among the pre-correction gray scale of the correction sub-pixel and the gray scale of the reference sub-pixel of the correction sub-pixel, G(H) is the larger gray scale among the pre-correction gray scale of the correction sub-pixel and the gray scale of the reference sub-pixel of the correction sub-pixel, and β is a gray scale transition coefficient, which is greater than 0 and less than 1, especially between 0.1 and 0.9. Further, in embodiments of the present disclosure, sub-pixels of different colors have different gray scale transition coefficients. For example, the gray scale transition coefficient may be determined based on the sensitivity of the eye to light of different colors. The more sensitive the eye is to light of a certain color, the lower the gray scale transition coefficient of the sub-pixel of that color may be. In this way, the gray-scale transition correction is performed on adjacent sub-pixels in the correction sub-pixel column by using different gray-scale transition coefficients, which can make the effect presented between the sub-pixels after the correction more uniform to the human eye and eliminate the jagged feeling caused by the large brightness difference between the correction sub-pixels felt by the human eye due to different sensitivities of the human eye to different colors. For example, the sub-pixel SP includes a red sub-pixel SPR, a green sub-pixel SPG, and a blue sub-pixel SPB, and gray scale transition coefficients of the red sub-pixel SPR, the green sub-pixel SPG and the blue sub-pixel SPB decrease in sequence.

In an embodiment of the present disclosure, when the red sub-pixel SPR is a correction sub-pixel, a corrected gray scale Gx(SPR) of the correction sub-pixel is round[G(RL)+x*(G(RH)−G(RL))], where G(RH) is the larger gray scale among a pre-correction gray scale of the correction sub-pixel and a gray scale of a reference sub-pixel of the correction sub-pixel, G(RL) is the smaller gray scale among the pre-correction gray scale of the correction sub-pixel and the gray scale of the reference sub-pixel of the correction sub-pixel, round ( ) represents rounding, and x is a gray scale transition coefficient of the red sub-pixel SPR.

When the green sub-pixel SPG is a correction sub-pixel, a corrected gray scale Gx(SPG) of the correction sub-pixel is round[G(GL)+γ*(G(GH)−G(GL))], where G(GH) is the larger gray scale among a pre-correction gray scale of the correction sub-pixel and a gray scale of a reference sub-pixel of the correction sub-pixel, G(GL) is the smaller gray scale among the pre-correction gray scale of the correction sub-pixel and the gray scale of the reference sub-pixel of the correction sub-pixel, and y is a gray scale transition coefficient of the green sub-pixel SPG.

When the blue sub-pixel SPB is a correction sub-pixel, a corrected gray scale Gx(SPB) of the correction sub-pixel is round[G(BL)+z*(G(BH)−G(BL))], where G(BH) is the larger gray scale among a pre-correction gray scale of the correction sub-pixel and a gray scale of a reference sub-pixel of the correction sub-pixel, G(BL) is the smaller gray scale among the pre-correction gray scale of the correction sub-pixel and the gray scale of the reference sub-pixel of the correction sub-pixel, and z is a gray scale transition coefficient of the blue sub-pixel SPB.

Furthermore, $0.1 \le z \le y \le x \le 0.9$.

In an embodiment of the present disclosure, there may be a large difference between gray scale transition coefficients of sub-pixels SP of different colors, for example, the difference is greater than or equal to 0.2, to fully compensate for the difference in sensitivity of the human eye to light of different colors. In an example, $y-z>0.2$; $x-y>0.2$.

In an embodiment of the present disclosure, $0.6 \le x \le 0.9$; $0.35 \le y \le 0.65$; $0.15 \le z \le 0.45$. For example, x=0.75; y=0.50; z=0.25.

In an embodiment of the present disclosure, the brightness threshold is 50 nits; the first number threshold is 5, and the second number threshold is 5; N1 is 5, and N2 is 5; the brightness of the pixel refers to the rated maximum brightness of the pixel at the maximum brightness of the display panel. When the gray-scale transition correction is performed on the correction sub-pixel, a gray-scale transition coefficient of the red sub-pixel is 0.75, a gray-scale transition coefficient of the green sub-pixel is 0.5, and a gray-scale transition coefficient of the blue sub-pixel is 0.25.

In an embodiment of the present disclosure, the brightness threshold Lset may be acquired by testing. For example, a picture containing the feature pattern area may be viewed in a preset environment, such as at a preset distance (e.g., 0.5 m) from the display panel PNL, and at a preset viewing angle (e.g., directly in front), and the brightness threshold Lset is adjusted so as to make jaggedness of the light-dark vertical demarcation line disappear or the degree of visibility thereof reduced to an acceptable level.

In some embodiments of the present disclosure, the brightness threshold Lset may be between 50 and 1000 nits, for example, it may be 50 nits. The brightness threshold of the display device may be determined by testing according to the usage scenario of the display panel and the requirement for quality.

In other embodiments of the present disclosure, the brightness threshold may also be expressed as a gray scale threshold, or other parameter thresholds related to the brightness threshold, so long as the brightness threshold can be directly or indirectly inferred.

In some embodiments of the present disclosure, the brightness of a pixel has a correspondence with a gray scale. Thus, the brightness of individual pixels can be determined based on the gray scale data of the pixel, and thus whether the difference in brightness between two adjacent pixels is greater than or equal to the brightness threshold Lset is determined based on the brightness of the pixel. In embodiments of the present disclosure, the brightness of individual sub-pixels can be determined based on the gray scales of the individual sub-pixels of the pixel; a sum of the brightness of the individual sub-pixels is the brightness of the pixel. In an example, the brightness of a sub-pixel may be determined based on the gray scale of the sub-pixel via a gamma curve.

In other embodiments of the present disclosure, the difference in brightness between two pixels may be not a difference in brightness between the actual brightness of the two pixels, but also may be a difference in theoretical maximum brightness between the two pixels, in order to reduce the calculation amount of the driving algorithm. For example, the theoretical maximum brightness of a pixel may be determined based on the rated maximum brightness of the display panel and the gray scale data of the pixel without considering whether the display panel displays picture in accordance with the rated maximum brightness; in such a case, the difference in the theoretical maximum brightness between the two pixels, i.e., the brightness threshold Lset' may be set between 40 nits-60 nits, or between 50 and 1000 nits, and may be 50 nits, for example. The control component CTR may be pre-stored with a gamma curve GAmax at the rated maximum brightness; after obtaining the gray scales of the individual sub-pixels of the pixel, the theoretical maximum brightness of the sub-pixels may be determined based on the gray scales of the sub-pixels and the gamma curve GAmax, and the theoretical maximum brightness of the pixel may be acquired based on the sum of the theoretical maximum brightness of the individual sub-pixels. For example, the rated maximum brightness of the display panel is between 300 and 1000 nits.

By way of example, a pixel includes three sub-pixels such as a red sub-pixel, a green sub-pixel, and a blue sub-pixel. In obtaining the gray scale data of the pixel, the gray scale of the red sub-pixel, the gray scale of the green sub-pixel, and the gray scale of the blue sub-pixel of the pixel may be acquired; then, based on the gray scale of the red sub-pixel and the gamma curve of the red sub-pixel under the rated maximum brightness, the theoretical maximum brightness of the red sub-pixel is determined; based on the gray scale of the green sub-pixel and the gamma curve of the green sub-pixel under the rated maximum brightness, the theoretical maximum brightness of the green sub-pixel is determined; based on the gray scale of the blue sub-pixel and the gamma curve of the blue sub-pixel under the rated maximum brightness, the theoretical maximum brightness of the blue sub-pixel is determined. Then, the sum of the theoretical maximum brightness of the red sub-pixel, the theoretical maximum brightness of the green sub-pixel and the theoretical maximum brightness of the blue sub-pixel is the theoretical maximum brightness of the pixel.

Alternatively, in other embodiments of the present disclosure, other methods may be employed to determine the brightness of the pixel (which may be an actual brightness, or may be a theoretical maximum brightness, or may be some other brightness associated with a gray scale).

In an embodiment of the present disclosure, the control component CTR may include a SOC (system-on-chip) board and a BCON (backlight control) board, and the SOC board is provided with a SOC chip; and the data handling module DHU may be the SOC chip (system-on-chip) or a part of the SOC chip. The SOC chip may receive initial picture data and perform processing such as sub-pixel ordering, transition area determination, and transition area correction on the initial picture data. Further, when the display device is a liquid crystal display device, the SOC chip may generate synchronous picture data and synchronous dimming data based on the picture data. The synchronous backlight data is used to be sent to the liquid crystal display panel PNL for displaying the picture. The synchronous dimming data is used to be sent to the MCU of the BCON board for controlling the duty cycles of the respective light areas of the BLU. In some embodiments, the SOC chip may generate the synchronous dimming data and the synchronous picture data based on the picture data to be displayed.

In an embodiment of the present disclosure, the control component CTR may include a SOC (system-on-chip) board and a BCON (backlight control) board, and the SOC board is provided with a SOC chip; and the data handling module DHU may be the SOC chip (system-on-chip) or a part of the SOC chip. The SOC chip may receive initial picture data and perform processing such as sub-pixel ordering, transition area determination, and transition area correction on the initial picture data. Further, when the display device is a liquid crystal display device, the SOC chip may generate synchronous picture data and synchronous dimming data based on the picture data. The synchronous backlight data is used to be sent to the PNL for displaying the picture. The synchronous dimming data is used to be sent to the MCU of the BCON board for controlling the duty cycles of the respective light areas of the BLU. In some embodiments, the SOC chip may generate the synchronous dimming data and the synchronous picture data based on the picture data to be displayed.

Figure 23:
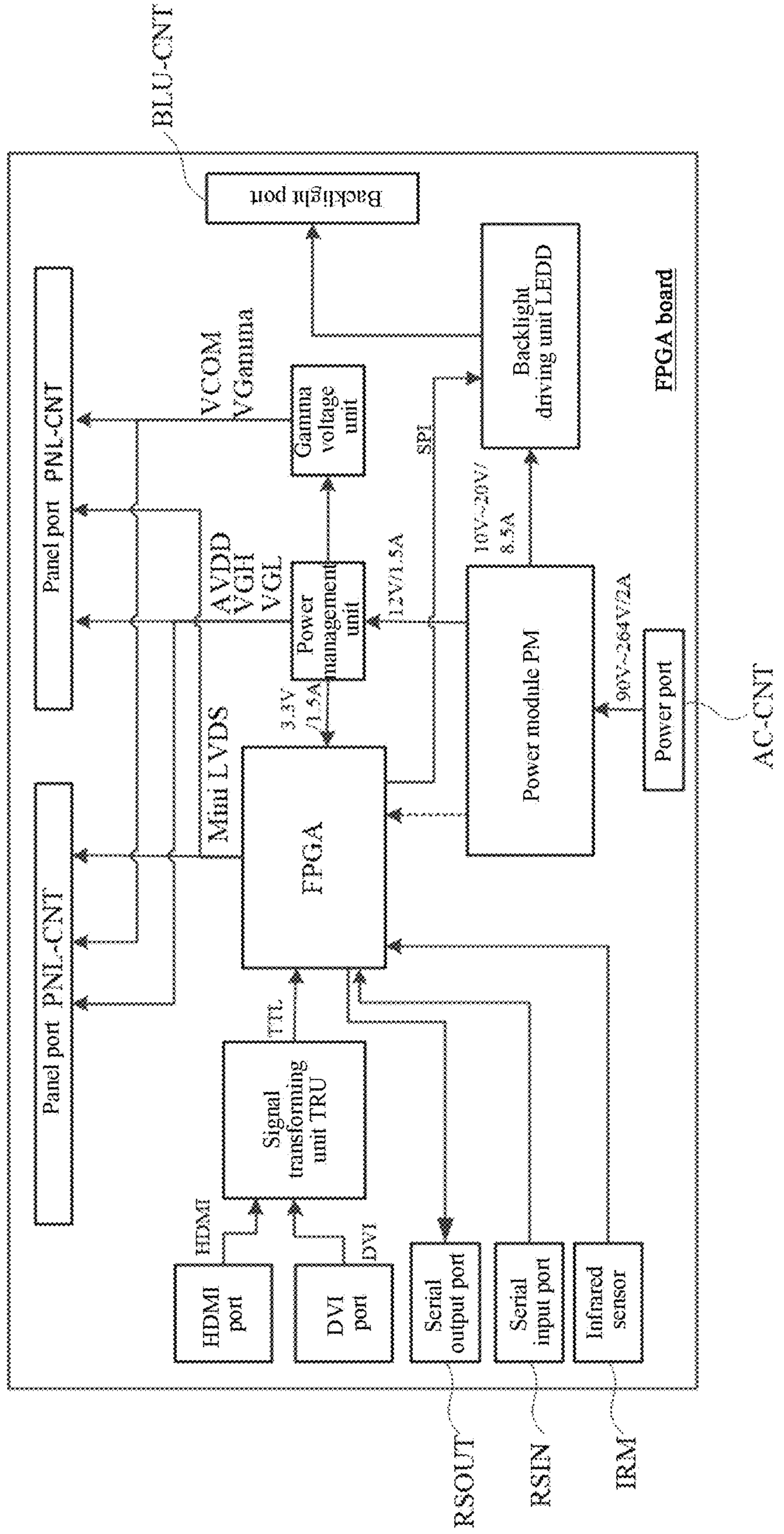
FIG. 23 illustrates a schematic structural diagram of an FPGA board in an embodiment of the present disclosure.

In another embodiment of the present disclosure, referring to FIG. 23, the control component CTR may include an FPGA (field programmable gate array) board, which may include an FPGA disposed on a circuit board. The data handling module DHU may be the FPGA or a part of the FPGA. The FPGA may receive initial picture data and perform processing such as sub-pixel ordering, transition area determination, and transition area correction on the initial picture data. Further, in a case where the display device is a liquid crystal display device, the FPGA may generate synchronous picture data and synchronous dimming data based on the picture data. The synchronous backlight data is used to be sent to the PNL for displaying the screen. The synchronous dimming data is used to drive the BLU. In some embodiments, the FPGA may generate the synchronous dimming data and the synchronous picture data based on the picture data to be displayed.

In an example, a backlight driving unit LEDD is provided on the FPGA board, and the synchronous dimming data generated by the FPGA can be directly sent to the backlight driving unit LEDD, and the backlight driving unit LEDD sends the duty cycle data of the respective light areas to the microchip MIC to which the respective light areas are connected in accordance with the dimming data. In this way, it can avoid the asynchronous response of the display panel PNL and the backlight module BLU caused by the MCU forwarding synchronous dimming data.

In an example, the circuit board of the FPGA board may also be provided with a power module PM, a power management unit PMIC, and a gamma voltage unit GMIC. The power module PM is configured to connect to an external power supply and to supply power to the power management unit PMIC and to the backlight driving unit LEDD. The power management unit PMIC is configured to supply a plurality of different power supply voltages to the liquid crystal display panel PNL and to supply power to the gamma voltage unit GMIC. The gamma voltage unit GMIC is configured to provide the liquid crystal display panel PNL with a common voltage VCOM and a gamma binding point voltage VGamma corresponding to respective gamma binding point gray scale. The FPGA is powered from the power module PM or the power management unit PMIC. In this way, the integrated board of the present disclosure can at least realize the functions of the screen driver boards, voltage boards and conversion boards in the related art, which may reduce the number of boards in the control component, thereby improving the integration of the control component and improving the assembly efficiency of the display device.

In an example, the circuit board of the FPGA board may also be provided with a panel port PNL-CNT for connecting to the liquid crystal display panel PNL and a backlight port BLU-CNT for connecting to the backlight module BLU, as well as a power port AC-CNT for connecting to an external power supply. Depending on the distribution of the binding pads on the liquid crystal display panel PNL, the panel port may be one or more. For example, the panel port may include two ports. According to the distribution of the binding pads on the light board of the backlight module BLU, the backlight port may be one or more. For example, nine backlight ports may be provided. Each backlight port may control one or more signal channels on the backlight module BLU, with a plurality of light area LEDA, such as a plurality of light area LEDA controlled by sequentially cascaded microchip MICs, provided within each signal channel. In some embodiments, the panel ports and the backlight ports may be sequentially arranged pads or connectors for plugging, or other feasible structures.

In an example, the circuit board of the FPGA board is further provided with a communication module. The communication module is configured to implement at least one function of receiving a video signal, receiving a control signal, and sending a signal outward. The communication module includes at least one video signal port and a signal transforming unit TRU; the video signal port is configured to receive video signals and forward them to the signal transforming unit TRU; the signal transforming unit TRU is configured to transcode the video signals into initial picture data and forward the initial picture data to the FPGA. In some embodiments, the signal transforming unit TRU may forward the picture data to the FPGA in the form of a TTL signal, e.g. in the form of a 24-channel TTL signal. It will be appreciated that in other examples of the present disclosure, the signal transforming unit TRU may also use other signals to forward the picture data, such as forwarding the picture data via SPI signals, LVDS signals, or Mini LVDS signals.

In some embodiments, the video signal port is selected from one or more of an HDMI port, a DVI port, a VGA port, and a DP port. In the example of FIG. 23, the HDMI port and the DVI port are provided on the FPGA board.

In some embodiments, the communication module may also include a serial communication port to enable the FPGA board card to communicate with an external device. Further, the serial communication port may include a serial input port RSIN and a serial output port RSOUT. The serial input port RSIN may receive external communication signals; for example, the serial input port RSIN is configured to receive external control signals and transmit them to the FPGA. The serial output port RSOUT is configured to send communication signals externally; for example, the serial output port RSOUT is configured to send outwardly signals generated by the FPGA. In an example, the serial input port RSIN and the serial output port RSOUT are RS-232 standard interfaces (asynchronous transmission standard interfaces).

In some embodiments, the serial input port RSIN may forward the communication signals to the FPGA and the FPGA may respond to the communication signals. For example, the debugging device may send a debugging signal (as a communication signal) to the FPGA via the serial input port RSIN, and the FPGA adjusts the display state of the display device in response to the debugging signal, such as adjusting the color temperature of the picture, adjusting the resolution, displaying the debugging interface, and the like. The serial output port RSOUT can receive the communication signal sent by the FPGA and forward it outward.

In some embodiments, the communication module further includes an infrared sensor IRM; the infrared sensor IRM is configured to receive an infrared signal while generating a control signal, and transmit the control signal to the FPGA. In other examples, the infrared sensor IRM may also send signals outwardly.

The display device and the control component and the driving method thereof provided by embodiments of the present disclosure can, when displaying the initial picture with the feature pattern area, correct the initial picture to display it as the target picture, and eliminate a possible jagged edge of the feature pattern area in the initial picture. In other words, the display device of the present disclosure can display the target picture based on the picture data of the received initial picture.

According to embodiments of the present disclosure, the feature pattern area of the initial picture includes at least one of the first feature pattern area TAA, the second feature pattern area TAB, or the third feature pattern area TAC. The first feature pattern area TAA includes the plurality of first feature pixel groups PA sequentially arranged along the column direction DV, and the first feature pixel group PA includes the first feature pixel PA1, the second feature pixel PA2 and the third feature pixel PA3 sequentially adjacent in the same row. The brightness difference between the first feature pixel PA1 and the second feature pixel PA2 is greater than or equal to the brightness threshold Lset, and the brightness difference between the third feature pixel PA3 and the second feature pixel PA2 is greater than or equal to the brightness threshold Lset. Individual first feature pixels PA1 are arranged in the same column. The second feature pattern area TAB includes the plurality of second feature pixel groups PB sequentially arranged along the column direction DV, and the second feature pixel group PB includes the fourth feature pixel PB1, the fifth feature pixel PB2 and the sixth feature pixel PB3 sequentially adjacent in the same row. The brightness difference between the fourth feature pixel PB1 and the fifth feature pixel PB2 is greater than or equal to the brightness threshold Lset, and the brightness difference between the sixth feature pixel PB3 and the fifth feature pixel PB2 is less than the brightness threshold Lset. Individual fourth feature pixels PB1 are arranged in the same column. The third feature pattern area TAC includes the first sub-pixel group TPA, the second sub-pixel group TPB and the third sub-pixel group TPC sequentially adjacent along the row direction DH. The second sub-pixel group TPB includes three sub-pixels SP sequentially adjacent along the row direction DH. The first sub-pixel group TPA and the third sub-pixel group TPC each include the plurality of sub-pixels SP sequentially adjacent along the row direction DH. In the first sub-pixel group TPA, gray scales of individual same-color sub-pixels SP are the same, and the number of sub-pixels SP in any the same color is N1. In the third sub-pixel group TPC, gray scales of individual same-color sub-pixels SP are the same, and the number of sub-pixels SP in any the same color is N2. N1 and N2 are both positive integers from 3 to 10. The brightness difference between the second sub-pixel group TPB and the pixel in the first sub-pixel group TPA is greater than or equal to the brightness threshold Lset, and the brightness difference between the second sub-pixel group TPB and the pixel in the third sub-pixel group TPC is greater than or equal to the brightness threshold Lset.

In the target picture, Gx(SA1) is between G(SA1) and G(SA10), where Gx(SA1) is the gray scale of the first correction sub-pixel SA1 in the target picture, G(SA1) is the gray scale of the first correction sub-pixel SA1 in the initial picture, and G(SA10) is the gray scale of the reference sub-pixel SA10 of the first correction sub-pixel. According to the arrangement mode of the sub-pixels on the display panel, the first correction sub-pixel SA1 is the sub-pixel SP of the first feature pixel PA1 close to the second feature pixel PA2, and the reference sub-pixel SA10 of the first correction sub-pixel is a sub-pixel SP located in the second feature pixel PA2 adjacent to the first correction sub-pixel SA1 and having the same color as the first correction sub-pixel SA1.

In the target picture, Gx(SA2) is between G(SA2) and G(SA20), where Gx(SA2) is the gray scale of the second correction sub-pixel SA2 in the target picture, G(SA2) is the gray scale of the second correction sub-pixel SA2 in the initial picture, and G(SA20) is the gray scale of the reference sub-pixel SA20 of the second correction sub-pixel. According to the arrangement mode of the sub-pixels on the display panel, the second correction sub-pixel SA2 is the sub-pixel SP of the third feature pixel PA3 close to the second feature pixel PA2, and the reference sub-pixel SA20 of the second correction sub-pixel is the sub-pixel SP located in the second feature pixel PA2 adjacent to the second correction sub-pixel SA2 and having the same color as the second correction sub-pixel SA2.

In the target picture, Gx(SB1) is between G(SB1) and G(SB10), where Gx(SB1) is the gray scale of the third correction sub-pixel SB1 in the target picture, G(SB1) is the gray scale of the third correction sub-pixel SB1 in the initial picture, and G(SB10) is the gray scale of the reference sub-pixel SB10 of the third correction sub-pixel. According to the arrangement mode of the sub-pixels on the display panel, the third correction sub-pixel SB1 is the sub-pixel SP of the fourth feature pixel PB1 close to the fifth feature pixel PB2, and the reference sub-pixel SB10 of the third correction sub-pixel is the sub-pixel SP located in the fifth feature pixel PB2 adjacent to the third correction sub-pixel SB1 and having the same color as the third correction sub-pixel SB1.

In the target picture, Gx(SC1) is between G(SC1) and G(SC10), where Gx(SC1) is the gray scale of the fourth correction sub-pixel SC1 in the target picture, G(SC1) is the gray scale of the fourth correction sub-pixel SC1 in the initial picture, and G(SC10) is the gray scale of the reference sub-pixel SC10 of the fourth correction sub-pixel. According to the arrangement mode of the sub-pixels on the display panel, the fourth correction sub-pixel SC1 is the sub-pixel SP in the first sub-pixel group TPA that is close to the second sub-pixel group TPB, and the reference sub-pixel SC10 of the fourth correction sub-pixel is the sub-pixel SP in the second sub-pixel group TPB that has the same color as the fourth correction sub-pixel SC1.

In the target picture, Gx(SC2) is between G(SC2) and G(SC20), where Gx(SC2) is the gray scale of the fifth correction sub-pixel SC2 in the target picture, G(SC2) is the gray scale of the fifth correction sub-pixel SC2 in the initial picture, and G(SC20) is the gray scale of the reference sub-pixel SC20 of the fifth correction sub-pixel. According to the arrangement mode of the sub-pixels on the display panel, the fifth correction sub-pixel SC2 is the sub-pixel SP in the third sub-pixel group TPC that is close to the second sub-pixel group TPB, and the reference sub-pixel SC20 of the fifth correction sub-pixel is the sub-pixel SP in the second sub-pixel group TPB that has the same color as the fifth correction sub-pixel SC2.

In some embodiments of the present disclosure, picture data of an initial picture with a selected pattern may be input to the display device, and it may be determined whether the display device adopts the driving method or the control component CTR of embodiments of the present disclosure by detecting the target picture data of the display device or the target picture displayed by the liquid crystal display panel PNL. The selected pattern may have at least one of the first feature pattern area TAA, the second feature pattern area TAB or the third feature pattern area TAC, for example, the selected pattern has at least one first feature pattern area TAA, at least one second feature pattern area TAB and at least one third feature pattern area TAC.

As an example, the initial picture input to the display device may have a pattern as shown in FIG. 9, which has a black background as a whole, but has a white vertical line (with a line width of one pixel), a white oblique line (with a line width not exceeding three sub-pixels) and a white curve (with a line width not exceeding three sub-pixels).

In the target picture displayed by the display device, if the white vertical line is expanded to both sides by one sub-pixel column, respectively, and a gray scale of a sub-pixel in this sub-pixel column is lower than a gray scale of a sub-pixel of the same color in the white vertical line, then the display device adopts the driving method of the present disclosure to acquire the first feature pattern area TAA and perform the gray scale transition correction on the first correction sub-pixel SA1 and the second correction sub-pixel SA2 in the first feature pattern area TAA.

In the target picture displayed by the display device, if at least one dot of the white curve is expanded to both sides along the row direction by one sub-pixel, respectively, and a gray scale of the expanded sub-pixel is less than a gray scale of a same-color sub-pixel of this dot (before expansion), and in the target picture displayed by the display device, if the at least one dot of the white curve is not respectively extended to both sides along the row direction by one sub-pixel at and near the intersection of the lines, then the display device adopts the driving method of the present disclosure to acquire the third feature pattern area TAC and perform the gray scale transition correction on the fourth correction sub-pixel SC1 and the fifth correction sub-pixel SC2 in the third feature pattern area TAC.

In the target picture displayed by the display device, if at least one dot of the white oblique line is expanded to both sides along the row direction by one sub-pixel, respectively, and a gray scale of the expanded sub-pixel is less than a gray scale of a same-color sub-pixel of this dot (before expansion), and in the target picture displayed by the display device, if the at least one dot of the white oblique line is not respectively extended to both sides along the row direction by one sub-pixel at and near the intersection of the lines, then the display device adopts the driving method of the present disclosure to acquire the third feature pattern area TAC and perform the gray scale transition correction on the fourth correction sub-pixel SC1 and the fifth correction sub-pixel SC2 in the third feature pattern area TAC.

Figure 10:
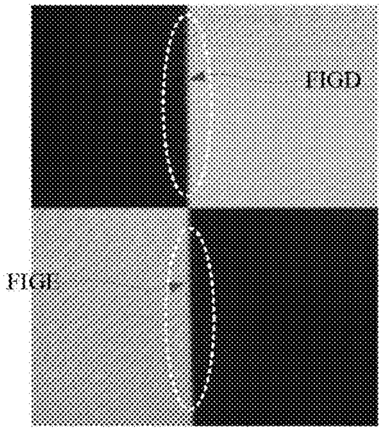
FIG. 10 illustrates a schematic diagram of existence of a vertical demarcation line between color block patterns included in an initial picture in an embodiment of the present disclosure.

As an example, the initial picture input to the display device may have a pattern as shown in FIG. 10, which is in a black-and-white checkerboard shape as a whole. In the target picture displayed by the display device, if a gray scale of a sub-pixel of a white pattern adjacent to a black pattern is reduced at a vertical boundary line between the black pattern and the white pattern, then the display device adopts the driving method of the present disclosure to acquire the second feature pattern area TAB and perform the gray scale transition correction on the third correction sub-pixel SB1 in the second feature pattern area TAB.

It is to be noted that, although the individual steps of the driving method for the display device of the present disclosure is depicted in a particular sequence in the accompanying figures, it is not required or implied that the steps must be performed in that particular sequence, or that all of the steps shown must be performed to achieve the desired result. Additional or alternatively, certain steps may be omitted, multiple steps may be combined into one step for execution, and/or one step may be decomposed into multiple steps for execution, etc.

Other embodiments of the present disclosure will be readily apparent to those skilled in the art upon consideration of the specification and practice of the disclosure herein. The present application is intended to cover any variations, uses, or adaptations of the present disclosure that follow the general principles of the present disclosure and include common knowledge or customary technical means in the art not disclosed herein. The specification and embodiments are to be regarded as exemplary only, and the true scope and spirit of the present disclosure is indicated by the appended claims.

What is claimed is:

1. A display device, comprising a display panel; wherein the display device is capable of displaying a target picture based on picture data of a received initial picture, and the display device is configured to adjust, when the initial picture comprises a feature pattern area, brightness of at least some sub-pixels of the feature pattern area to generate the target picture;

wherein the feature pattern area comprises at least one of a first feature pattern area, a second feature pattern area or a third feature pattern area;

the first feature pattern area comprises a plurality of first feature pixel groups sequentially arranged along a column direction, and a first feature pixel group comprises a first feature pixel, a second feature pixel and a third feature pixel sequentially adjacent in a same row;

a brightness difference between the first feature pixel and the second feature pixel is greater than or equal to a brightness threshold, and a brightness difference between the third feature pixel and the second feature pixel is greater than or equal to the brightness threshold;

individual first feature pixels are arranged in a same column;

the second feature pattern area comprises a plurality of second feature pixel groups sequentially arranged along the column direction, and a second feature pixel group comprises a fourth feature pixel, a fifth feature pixel and a sixth feature pixel sequentially adjacent in a same row;

a brightness difference between the fourth feature pixel and the fifth feature pixel is greater than or equal to the brightness threshold, and a brightness difference between the sixth feature pixel and the fifth feature pixel is less than the brightness threshold;

individual fourth feature pixels are arranged in a same column;

the third feature pattern area comprises a first sub-pixel group, a second sub-pixel group and a third sub-pixel group sequentially adjacent along a row direction;

the second sub-pixel group comprises three sub-pixel sequentially adjacent along the row direction, and the first sub-pixel group and the third sub-pixel group each comprise a plurality of sub-pixels sequentially adjacent along the row direction;

in the first sub-pixel group, gray scales of individual same-color sub-pixels are the same, and a number of sub-pixels in any the same color is N1, in the third sub-pixel group, gray scales of individual same-color sub-pixels are the same, and a number of sub-pixels in any the same color is N2, where N1 and N2 are positive integers from 1 to 1000;

a brightness difference between a pixel in the second sub-pixel group and a pixel in the first sub-pixel group is greater than or equal to the brightness threshold, and a brightness difference between the pixel in the second sub-pixel group and a pixel in the third sub-pixel group is greater than or equal to the brightness threshold;

when the first feature pattern area is adjusted, Gx(SA1) is between G(SA1) and G(SA10), where Gx(SA1) is a gray scale of a first correction sub-pixel in the target picture, G(SA1) is a gray scale of the first correction sub-pixel in the initial picture, and G(SA10) is a gray scale of a reference sub-pixel of the first correction sub-pixel; according to an arrangement mode of sub-pixels on the display panel, the first correction sub-pixel is a sub-pixel of the first feature pixel that is close to the second feature pixel, and the reference sub-pixel of the first correction sub-pixel is a sub-pixel located in the second feature pixel adjacent to the first correction sub-pixel and having the same color as the first correction sub-pixel; Gx(SA2) is between G(SA2) and G(SA20), where Gx(SA2) is a gray scale of a second correction sub-pixel in the target picture, G(SA2) is a gray scale of the second correction sub-pixel in the initial picture, and G(SA20) is a gray scale of a reference sub-pixel of the second correction sub-pixel; according to the arrangement mode of the sub-pixels on the display panel, the second correction sub-pixel is a sub-pixel of the third feature pixel that is close to the second feature pixel, and the reference sub-pixel of the second correction sub-pixel is a sub-pixel located in the second feature pixel adjacent to the second correction sub-pixel and having the same color as the second correction sub-pixel;

when the second feature pattern area is adjusted, Gx(SB1) is between G(SB1) and G(SB10), where Gx(SB1) is a gray scale of a third correction sub-pixel in the target picture, G(SB1) is a gray scale of the third correction sub-pixel in the initial picture, and G(SB10) is a gray scale of a reference sub-pixel of the third correction sub-pixel; according to the arrangement mode of the sub-pixels on the display panel, the third correction sub-pixel is a sub-pixel of the fourth feature pixel that is close to the fifth feature pixel, and the reference sub-pixel of the third correction sub-pixel is a sub-pixel located in the fifth feature pixel adjacent to the third correction sub-pixel and having the same color as the third correction sub-pixel; and when the third feature pattern area is adjusted, Gx(SC1) is between G(SC1) and G(SC10), where Gx(SC1) is a gray scale of a fourth correction sub-pixel in the target picture, G(SC1) is a gray scale of the fourth correction sub-pixel in the initial picture, and G(SC10) is a gray scale of a reference sub-pixel of the fourth correction sub-pixel; according to the arrangement mode of the sub-pixels on the display panel, the fourth correction sub-pixel is a sub-pixel in the first feature pixel group that is close to the second feature pixel group, and the reference sub-pixel of the fourth correction sub-pixel is a sub-pixel in the second sub-pixel group that has the same color as the fourth correction sub-pixel; Gx(SC2) is between G(SC2) and G(SC20), where Gx(SC2) is a gray scale of a fifth correction sub-pixel in the target picture, G(SC2) is a gray scale of the fifth correction sub-pixel in the initial picture, and G(SC20) is a gray scale of a reference sub-pixel of the fifth correction sub-pixel; according to the arrangement mode of the sub-pixels on the display panel, the fifth correction sub-pixel is a sub-pixel in the third sub-pixel group that is close to the second sub-pixel group, and the reference sub-pixel of the fifth correction sub-pixel is a sub-pixel in the second sub-pixel group that has the same color as the fifth correction sub-pixel.

2. The display device according to claim 1, wherein gray scales of individual sub-pixel of a feature pixel are the same in the initial picture; and wherein the reference sub-pixel of the first correction sub-pixel is any one or more sub-pixels located in the second feature pixel adjacent to the first correction sub-pixel, or a sub-pixel located in the second feature pixel and adjacent to the first correction sub-pixel;

the reference sub-pixel of the second correction sub-pixel is any one or more sub-pixels located in the second feature pixel adjacent to the second correction sub-pixel, or a sub-pixel located in the second feature pixel and adjacent to the second correction sub-pixel; and the reference sub-pixel of the third correction sub-pixel is any one or more sub-pixels located in the fifth feature pixel adjacent to the third correction sub-pixel, or a sub-pixel located in the fifth feature pixel and adjacent to the third correction sub-pixel.

3. The display device according to claim 1, wherein gray scales of individual sub-pixels in the second sub-pixel group are the same;

the reference sub-pixel of the fourth correction sub-pixel is any one or more sub-pixels located in the second sub-pixel group, or a sub-pixel located in the second sub-pixel group and adjacent to the fourth correction sub-pixel; and the reference sub-pixel of the fifth correction sub-pixel is any one or more sub-pixels located in the second sub-pixel group, or a sub-pixel located in the second sub-pixel group and adjacent to the fifth correction sub-pixel.

4. The display device according to claim 1, wherein the second sub-pixel group comprises 3 to 5 sub-pixels, and gray scales of individual sub-pixels are the same;

the reference sub-pixel of the fourth correction sub-pixel is any one or more sub-pixels located in the second sub-pixel group, or a sub-pixel located in the second sub-pixel group and adjacent to the fourth correction sub-pixel; and the reference sub-pixel of the fifth correction sub-pixel is any one or more sub-pixels located in the second sub-pixel group, or a sub-pixel located in the second sub-pixel group and adjacent to the fifth correction sub-pixel.

5. The display device according to claim 1, wherein the display panel comprises a plurality of pixels distributed in an array, and any one of the pixels comprises a plurality of sub-pixels of different colors arranged adjacent along the row direction; individual sub-pixels are arranged in a plurality of sub-pixel columns; and two adjacent sub-pixels are different in color in any one of the sub-pixel columns;

wherein the display device is a spliced display device; the display device comprises a plurality of display modules arranged in a matrix, provided in a spliced manner and comprising the display panel;

wherein, on at least one side of the display panel, a distance between an edge of a display area of the display panel and an edge of the display panel is less than or equal to 2 millimeters; and wherein a brightness difference between pixels is a theoretical maximum brightness difference between the pixels; or the brightness difference between the pixels is an actual brightness difference between the pixels.

6. The display device according to claim 1, wherein a number of first feature pixel groups in the first feature pattern area is greater than or equal to a first number threshold, and the first number threshold is a positive integer greater than or equal to 3; and/or, a number of second feature pixel groups in the second feature pattern area is greater than or equal to a second number threshold, and the second number threshold is a positive integer greater than or equal to 3; and wherein the first number threshold is greater than or equal to 5, and the second number threshold is greater than or equal to 5.

7. The display device according to claim 1, wherein N1 and N2 are positive integers from 3 to 10;

wherein N1 and N2 are 5;

wherein the brightness threshold is greater than or equal to 50 nits; and wherein the brightness threshold is 50 nits.

8. The display device according to claim 1, wherein the display device is further configured to:

determine whether a second feature pattern area group exists, wherein the second feature pattern area group comprises a selected second feature pattern area and an auxiliary second feature pattern area; a fourth feature pixel of the selected second feature pattern area is a fifth feature pixel of the auxiliary second feature pattern area, and a fifth feature pixel of the selected second feature pattern area is a fourth feature pixel of the auxiliary second feature pattern area; a gray scale of the fourth feature pixel of the selected second feature pattern area is greater than a gray scale of the fifth feature pixel of the selected second feature pattern area; and when the second feature pattern area group exists, gray scale transition correction is performed on a third correction sub-pixel of the selected second feature pattern area and the gray scale transition correction is not performed on a third correction sub-pixel of the auxiliary second feature pattern area; and wherein the display device is further configured such that:

in a case that the feature pattern area comprises the first feature pattern area and the third feature pattern area, if a pixel satisfies the first feature pattern area and satisfies the third feature pattern area, the pixel belongs to the first feature pattern area.

9. A driving method for a display device, wherein a display panel of the display device comprises a plurality of pixels distributed in an array, and any one of the pixels comprises a plurality of sub-pixels of different colors arranged adjacent along a row direction; individual sub-pixels are arranged in a plurality of sub-pixel columns;

and two adjacent sub-pixels are different in color in any one of the sub-pixel columns;

the driving method for the display device comprises:

acquiring picture data;

acquiring a feature pattern area according to the picture data;

using at least some sub-pixels in the feature pattern area as correction sub-pixels, and performing gray scale transition correction on the correction sub-pixels to adjust the feature pattern area; and driving the display panel according to corrected gray scales of the correction sub-pixels in the feature pattern area;

wherein the feature pattern area comprises at least one of a first feature pattern area, a second feature pattern area or a third feature pattern area;

the first feature pattern area comprises a plurality of first feature pixel groups sequentially arranged along a column direction, and a first feature pixel group comprises a first feature pixel, a second feature pixel and a third feature pixel sequentially adjacent in a same row;

a brightness difference between the first feature pixel and the second feature pixel is greater than or equal to a brightness threshold, and a brightness difference between the third feature pixel and the second feature pixel is greater than or equal to the brightness threshold;

individual first feature pixels are arranged in a same column;

the second feature pattern area comprises a plurality of second feature pixel groups sequentially arranged along the column direction, and a second feature pixel group comprises a fourth feature pixel, a fifth feature pixel and a sixth feature pixel sequentially adjacent in a same row;

a brightness difference between the fourth feature pixel and the fifth feature pixel is greater than or equal to the brightness threshold, and a brightness difference between the sixth feature pixel and the fifth feature pixel is less than the brightness threshold;

individual fourth feature pixels are arranged in a same column;

the third feature pattern area comprises a first sub-pixel group, a second sub-pixel group and a third sub-pixel group sequentially adjacent along a row direction;

the second sub-pixel group comprises three sub-pixel sequentially adjacent along the row direction, and the first sub-pixel group and the third sub-pixel group each comprise a plurality of sub-pixels sequentially adjacent along the row direction;

in the first sub-pixel group, gray scales of individual same-color sub-pixels are the same, and a number of sub-pixels in any the same color is N1, in the third sub-pixel group, gray scales of individual same-color sub-pixels are the same, and a number of sub-pixels in any the same color is N2, where N1 and N2 are positive integers from 1 to 1000;

a brightness difference between a pixel in the second sub-pixel group and a pixel in the first sub-pixel group is greater than or equal to the brightness threshold, and a brightness difference between the pixel in the second sub-pixel group and a pixel in the third sub-pixel group is greater than or equal to the brightness threshold;

when the first feature pattern area is adjusted, Gx(SA1) is between G(SA1) and G(SA10), where Gx(SA1) is a gray scale of a first correction sub-pixel in a target picture, G(SA1) is a gray scale of the first correction sub-pixel in an initial picture, and G(SA10) is a gray scale of a reference sub-pixel of the first correction sub-pixel; according to an arrangement mode of sub-pixels on the display panel, the first correction sub-pixel is a sub-pixel of the first feature pixel that is close to the second feature pixel, and the reference sub-pixel of the first correction sub-pixel is a sub-pixel located in the second feature pixel adjacent to the first correction sub-pixel and having the same color as the first correction sub-pixel; Gx(SA2) is between G(SA2) and G(SA20), where Gx(SA2) is a gray scale of a second correction sub-pixel in the target picture, G(SA2) is a gray scale of the second correction sub-pixel in the initial picture, and G(SA20) is a gray scale of a reference sub-pixel of the second correction sub-pixel; according to the arrangement mode of the sub-pixels on the display panel, the second correction sub-pixel is a sub-pixel of the third feature pixel that is close to the second feature pixel, and the reference sub-pixel of the second correction sub-pixel is a sub-pixel located in the second feature pixel adjacent to the second correction sub-pixel and having the same color as the second correction sub-pixel;

when the second feature pattern area is adjusted, Gx(SB1) is between G(SB1) and G(SB10), where Gx(SB1) is a gray scale of a third correction sub-pixel in the target picture, G(SB1) is a gray scale of the third correction sub-pixel in the initial picture, and G(SB10) is a gray scale of a reference sub-pixel of the third correction sub-pixel; according to the arrangement mode of the sub-pixels on the display panel, the third correction sub-pixel is a sub-pixel of the fourth feature pixel that is close to the fifth feature pixel, and the reference sub-pixel of the third correction sub-pixel is a sub-pixel located in the fifth feature pixel adjacent to the third correction sub-pixel and having the same color as the third correction sub-pixel; and when the third feature pattern area is adjusted, Gx(SC1) is between G(SC1) and G(SC10), where Gx(SC1) is a gray scale of a fourth correction sub-pixel in the target picture, G(SC1) is a gray scale of the fourth correction sub-pixel in the initial picture, and G(SC10) is a gray scale of a reference sub-pixel of the fourth correction sub-pixel; according to the arrangement mode of the sub-pixels on the display panel, the fourth correction sub-pixel is a sub-pixel in the first feature pixel group that is close to the second feature pixel group, and the reference sub-pixel of the fourth correction sub-pixel is a sub-pixel in the second sub-pixel group that has the same color as the fourth correction sub-pixel; Gx(SC2) is between G(SC2) and G(SC20), where Gx(SC2) is a gray scale of a fifth correction sub-pixel in the target picture, G(SC2) is a gray scale of the fifth correction sub-pixel in the initial picture, and G(SC20) is a gray scale of a reference sub-pixel of the fifth correction sub-pixel; according to the arrangement mode of the sub-pixels on the display panel, the fifth correction sub-pixel is a sub-pixel in the third sub-pixel group that is close to the second sub-pixel group, and the reference sub-pixel of the fifth correction sub-pixel is a sub-pixel in the second sub-pixel group that has the same color as the fifth correction sub-pixel.

10. The driving method according to claim 9, wherein gray scales of individual sub-pixel of a feature pixel are the same in the initial picture; and wherein the reference sub-pixel of the first correction sub-pixel is any one or more sub-pixels located in the second feature pixel adjacent to the first correction sub-pixel, or a sub-pixel located in the second feature pixel and adjacent to the first correction sub-pixel;

the reference sub-pixel of the second correction sub-pixel is any one or more sub-pixels located in the second feature pixel adjacent to the second correction sub-pixel, or a sub-pixel located in the second feature pixel and adjacent to the second correction sub-pixel; and the reference sub-pixel of the third correction sub-pixel is any one or more sub-pixels located in the fifth feature pixel adjacent to the third correction sub-pixel, or a sub-pixel located in the fifth feature pixel and adjacent to the third correction sub-pixel.

11. The driving method according to claim 9, wherein gray scales of individual sub-pixels in the second sub-pixel group are the same;

the reference sub-pixel of the fourth correction sub-pixel is any one or more sub-pixels located in the second sub-pixel group, or a sub-pixel located in the second sub-pixel group and adjacent to the fourth correction sub-pixel; and the reference sub-pixel of the fifth correction sub-pixel is any one or more sub-pixels located in the second sub-pixel group, or a sub-pixel located in the second sub-pixel group and adjacent to the fifth correction sub-pixel.

12. The driving method according to claim 9, wherein the second sub-pixel group comprises 3 to 5 sub-pixels, and gray scales of individual sub-pixels are the same;

the reference sub-pixel of the fourth correction sub-pixel is any one or more sub-pixels located in the second sub-pixel group, or a sub-pixel located in the second sub-pixel group and adjacent to the fourth correction sub-pixel; and the reference sub-pixel of the fifth correction sub-pixel is any one or more sub-pixels located in the second sub-pixel group, or a sub-pixel located in the second sub-pixel group and adjacent to the fifth correction sub-pixel.

13. The driving method according to claim 9, wherein the using the at least some sub-pixels in the feature pattern area as the correction sub-pixels further comprises:

determining whether a second feature pattern area group exists, wherein the second feature pattern area group comprises a selected second feature pattern area and an auxiliary second feature pattern area; a fourth feature pixel of the selected second feature pattern area is a fifth feature pixel of the auxiliary second feature pattern area, and a fifth feature pixel of the selected second feature pattern area is a fourth feature pixel of the auxiliary second feature pattern area; a gray scale of the fourth feature pixel of the selected second feature pattern area is greater than a gray scale of the fifth feature pixel of the selected second feature pattern area; and when the second feature pattern area group exists, gray scale transition correction is performed on a third correction sub-pixel of the selected second feature pattern area and the gray scale transition correction is not performed on a third correction sub-pixel of the auxiliary second feature pattern area.

14. The driving method according to claim 9, wherein a number of first feature pixel groups in the first feature pattern area is greater than or equal to a first number threshold, a number of second feature pixel groups in the second feature pattern area is greater than or equal to a second number threshold, and the first number threshold and the second number threshold are positive integers greater than or equal to 3;

wherein the first number threshold is greater than or equal to 5, and the second number threshold is greater than or equal to 5; and wherein the acquiring the feature pattern area according to the picture data comprises:

in a case that the feature pattern area comprises the first feature pattern area and the third feature pattern area, if a pixel satisfies the first feature pattern area and satisfies the third feature pattern area, the pixel belongs to the first feature pattern area.

15. The driving method according to claim 9, wherein N1 and N2 are positive integers from 3 to 10; and wherein the driving method further comprises:

determining, according to a gray scale of each sub-pixel of a pixel and rated maximum brightness of the display panel, brightness of the pixel, wherein the brightness of the pixel is a sum of rated maximum brightness of individual sub-pixels, and rated maximum brightness of a sub-pixel is determined according to a gray scale of the sub-pixel and the rated maximum brightness of the display panel.

16. The driving method according to claim 9, wherein the sub-pixel comprises a red sub-pixel, a green sub-pixel and a blue sub-pixel;

when a correction sub-pixel is the red sub-pixel, a corrected gray scale Gx(SPR) of the correction sub-pixel is round[G(RL)+x*(G(RH)−G(RL))], where G(RH) is a larger gray scale among a pre-correction gray scale of the correction sub-pixel and a gray scale of a reference sub-pixel of the correction sub-pixel, G(RL) is a smaller gray scale among the pre-correction gray scale of the correction sub-pixel and the gray scale of the reference sub-pixel of the correction sub-pixel, and round( ) represents rounding;

when the correction sub-pixel is the green sub-pixel, a corrected gray scale Gx(SPG) of the correction sub-pixel is round[G(GL)+y*(G(GH)−G(GL))], where G(GH) is a larger gray scale among a pre-correction gray scale of the correction sub-pixel and a gray scale of a reference sub-pixel of the correction sub-pixel, and G(GL) is a smaller gray scale among the pre-correction gray scale of the correction sub-pixel and the gray scale of the reference sub-pixel of the correction sub-pixel;

when the correction sub-pixel is the blue sub-pixel, a corrected gray scale Gx(SPB) of the correction sub-pixel is round[G(BL)+z*(G(BH)−G(BL))], where G(BH) is a larger gray scale among a pre-correction gray scale of the correction sub-pixel and a gray scale of a reference sub-pixel of the correction sub-pixel, and G(BL) is a smaller gray scale among the pre-correction gray scale of the correction sub-pixel and the gray scale of the reference sub-pixel of the correction sub-pixel; and $$0.1 \le z < y < x \le 0.9.$$

17. The driving method according to claim 16, wherein y−z>0.2; x−y>0.2.

18. The driving method according to claim 16, wherein 0.6≤x≤0.9; 0.35≤y≤0.65; 0.15≤z≤0.45.

19. The driving method according to claim 16, wherein x=0.75; y=0.50; z=0.25.

20. The driving method according to claim 9, wherein the acquiring the picture data comprises:

acquiring picture data of the initial picture; and adjusting, according to the arrangement mode of the sub-pixels on the display panel, an arrangement order of gray scales of at least some sub-pixels in the picture data of the initial picture to acquire ordered picture data.

* * * * *